US011332011B2

(12) United States Patent
Couillard et al.

(10) Patent No.: US 11,332,011 B2
(45) Date of Patent: May 17, 2022

(54) COLD FORMING OF COMPLEXLY CURVED GLASS ARTICLES

(71) Applicant: CORNING INCORPORATED, Corning, NY (US)

(72) Inventors: James Gregory Couillard, Ithaca, NY (US); Atul Kumar, Horseheads, NY (US); Yawei Sun, Elmira, NY (US); Wendell Porter Weeks, Corning, NY (US)

(73) Assignee: Corning Incorporated, Corning, NY (US)

( * ) Notice: Subject to any disclaimer, the term of this patent is extended or adjusted under 35 U.S.C. 154(b) by 311 days.

(21) Appl. No.: 16/631,558

(22) PCT Filed: Jul. 18, 2017

(86) PCT No.: PCT/US2017/042606
§ 371 (c)(1),
(2) Date: Jan. 16, 2020

(87) PCT Pub. No.: WO2019/017915
PCT Pub. Date: Jan. 24, 2019

(65) Prior Publication Data
US 2020/0171952 A1 Jun. 4, 2020

(51) Int. Cl.
*B60K 37/02* (2006.01)
*B60K 37/04* (2006.01)
(Continued)

(52) U.S. Cl.
CPC .............. *B60K 37/04* (2013.01); *B60K 37/06* (2013.01); *C03B 23/0235* (2013.01);
(Continued)

(58) Field of Classification Search
CPC ........ B60K 2370/143; B60K 2370/152; B60K 2370/1531; B60K 2370/339;
(Continued)

(56) References Cited

U.S. PATENT DOCUMENTS 2,068,030 A  1/1937  Lieser
2,608,030 A  8/1952  Jendrisak
(Continued)

FOREIGN PATENT DOCUMENTS

CN  1587132 A  3/2005
CN  1860081 A  11/2006
(Continued)

OTHER PUBLICATIONS

Chinese Patent Application No. 201780016307.2, Office Action dated Aug. 19, 2021, 17 pages (10 pages of English Translation and 7 pages of Original Document), Chinese Patent Office.
(Continued)

*Primary Examiner* — Insa Sadio

(57) ABSTRACT

Embodiments of this disclosure pertain to a vehicle interior system comprising a base having a base surface; and a glass article coupled to the surface, wherein the glass article comprises a first portion comprising a first elastically deformed surface forming a first concave shape with a first radius of curvature from about 20 mm to about 2000 mm, and a second elastically deformed surface directly opposite the first elastically deformed surface that forms a second convex shape, wherein the second elastically deformed surface has a surface compressive stress that is less than a compressive stress at the first elastically deformed surface, and a second portion adjacent the first portion, wherein the second portion is substantially planar portion or curved.

20 Claims, 16 Drawing Sheets

(51) Int. Cl.
  *B60K 37/06* (2006.01)
  *C03B 23/023* (2006.01)
(52) U.S. Cl.
  CPC .. *B60K 2370/143* (2019.05); *B60K 2370/152* (2019.05); *B60K 2370/1531* (2019.05); *B60K 2370/37* (2019.05); *B60K 2370/39* (2019.05); *B60K 2370/774* (2019.05); *B60K 2370/81* (2019.05)
(58) Field of Classification Search
  CPC ............ B60K 2370/37; B60K 2370/39; B60K 2370/693; B60K 2370/774; B60K 2370/81; B60K 35/00; B60K 37/04; B60K 37/06; C03B 23/023; C03B 23/0235
  See application file for complete search history.

(56) References Cited

U.S. PATENT DOCUMENTS

| | | |
|---|---|---|
| 3,197,903 A | 8/1965 | Walley |
| 3,338,696 A | 8/1967 | Dockerty |
| 3,582,456 A | 6/1971 | Stolki |
| 3,682,609 A | 8/1972 | Dockerty |
| 3,753,840 A | 8/1973 | Plumat |
| 3,778,335 A | 12/1973 | Boyd |
| 3,790,430 A | 2/1974 | Mochel |
| 3,799,817 A | 3/1974 | Laethem |
| 4,147,527 A | 4/1979 | Bystrov et al. |
| 4,238,265 A | 12/1980 | Deminet |
| 4,445,953 A | 5/1984 | Hawk |
| 4,455,338 A | 6/1984 | Henne |
| 4,859,636 A | 8/1989 | Aratani et al. |
| 4,899,507 A | 2/1990 | Mairlot |
| 4,969,966 A | 11/1990 | Norman |
| 4,985,099 A | 1/1991 | Mertens et al. |
| 5,108,480 A | 4/1992 | Sugiyama |
| 5,154,117 A | 10/1992 | Didelot et al. |
| 5,173,102 A | 12/1992 | Weber et al. |
| 5,245,468 A | 9/1993 | Demiryont et al. |
| 5,250,146 A | 10/1993 | Horvath |
| 5,264,058 A | 11/1993 | Hoagland et al. |
| 5,300,184 A | 4/1994 | Masunaga |
| 5,711,119 A | 1/1998 | Cornils et al. |
| 5,897,937 A | 4/1999 | Cornils et al. |
| 6,044,662 A | 4/2000 | Morin |
| 6,086,983 A | 7/2000 | Yoshizawa |
| 6,101,748 A | 8/2000 | Cass et al. |
| 6,242,931 B1 | 6/2001 | Hembree et al. |
| 6,265,054 B1 | 7/2001 | Bravet et al. |
| 6,270,605 B1 | 8/2001 | Doerfler |
| 6,274,219 B1 | 8/2001 | Schuster et al. |
| 6,287,674 B1 | 9/2001 | Verlinden et al. |
| 6,302,985 B1 | 10/2001 | Takahashi et al. |
| 6,332,690 B1 | 12/2001 | Murofushi |
| 6,387,515 B1 | 5/2002 | Joret et al. |
| 6,420,800 B1 | 7/2002 | Levesque et al. |
| 6,426,138 B1 | 7/2002 | Narushima et al. |
| 6,582,799 B1 | 6/2003 | Brown et al. |
| 6,620,365 B1 | 9/2003 | Odoi et al. |
| 6,816,225 B2 | 11/2004 | Colgan et al. |
| 6,903,871 B2 | 6/2005 | Page |
| 7,297,040 B2 | 11/2007 | Chang et al. |
| 7,375,782 B2 | 5/2008 | Yamazaki et al. |
| 7,478,930 B2 | 1/2009 | Choi |
| 7,489,303 B1 | 2/2009 | Pryor |
| 7,542,302 B1 | 6/2009 | Curnalia et al. |
| 7,750,821 B1 | 7/2010 | Taborisskiy et al. |
| 7,955,470 B2 | 6/2011 | Kapp et al. |
| 8,298,431 B2 | 10/2012 | Chwu et al. |
| 8,344,369 B2 | 1/2013 | Yamazaki et al. |
| 8,521,955 B2 | 8/2013 | Arulambalam et al. |
| 8,549,885 B2 | 10/2013 | Dannoux et al. |
| 8,586,492 B2 | 11/2013 | Barefoot et al. |
| 8,652,978 B2 | 2/2014 | Dejneka et al. |
| 8,692,787 B2 | 4/2014 | Imazeki |
| 8,702,253 B2 | 4/2014 | Lu et al. |
| 8,765,262 B2 | 7/2014 | Gross |
| 8,814,372 B2 | 8/2014 | Vandal et al. |
| 8,833,106 B2 | 9/2014 | Dannoux et al. |
| 8,912,447 B2 | 12/2014 | Leong et al. |
| 8,923,693 B2 | 12/2014 | Yeates |
| 8,962,084 B2 | 2/2015 | Brackley et al. |
| 8,967,834 B2 | 3/2015 | Timmerman et al. |
| 8,969,226 B2 | 3/2015 | Dejneka et al. |
| 8,978,418 B2 | 3/2015 | Balduin et al. |
| 9,007,226 B2 | 4/2015 | Chang |
| 9,061,934 B2 | 6/2015 | Bisson et al. |
| 9,090,501 B2 | 7/2015 | Okahata et al. |
| 9,109,881 B2 | 8/2015 | Roussev et al. |
| 9,140,543 B1 | 9/2015 | Allan et al. |
| 9,156,724 B2 | 10/2015 | Gross |
| 9,223,162 B2 | 12/2015 | Deforest et al. |
| 9,240,437 B2 | 1/2016 | Shieh et al. |
| 9,278,500 B2 | 3/2016 | Filipp |
| 9,278,655 B2 | 3/2016 | Jones et al. |
| 9,290,413 B2 | 3/2016 | Dejneka et al. |
| 9,346,703 B2 | 5/2016 | Bookbinder et al. |
| 9,346,706 B2 | 5/2016 | Bazemore et al. |
| 9,357,638 B2 | 5/2016 | Lee et al. |
| 9,442,028 B2 | 9/2016 | Roussev et al. |
| 9,446,723 B2 | 9/2016 | Stepanski |
| 9,469,561 B2 | 10/2016 | Kladias et al. |
| 9,517,967 B2 | 12/2016 | Dejneka et al. |
| 9,573,843 B2 | 2/2017 | Keegan et al. |
| 9,593,042 B2 | 3/2017 | Hu et al. |
| 9,595,960 B2 | 3/2017 | Wilford |
| 9,606,625 B2 | 3/2017 | Levesque et al. |
| 9,617,180 B2 | 4/2017 | Bookbinder et al. |
| 9,663,396 B2 | 5/2017 | Miyasaka et al. |
| 9,694,570 B2 | 7/2017 | Levasseur et al. |
| 9,700,985 B2 | 7/2017 | Kashima et al. |
| 9,701,564 B2 | 7/2017 | Bookbinder et al. |
| 9,720,450 B2 | 8/2017 | Choi et al. |
| 9,724,727 B2 | 8/2017 | Domey et al. |
| 9,802,485 B2 | 10/2017 | Masuda et al. |
| 9,815,730 B2 | 11/2017 | Marjanovic et al. |
| 9,821,509 B2 | 11/2017 | Kastell |
| 9,895,975 B2 | 2/2018 | Lee et al. |
| 9,902,640 B2 | 2/2018 | Dannoux et al. |
| 9,931,817 B2 | 4/2018 | Rickerl |
| 9,933,820 B2 | 4/2018 | Helot et al. |
| 9,947,882 B2 | 4/2018 | Zhang et al. |
| 9,955,602 B2 | 4/2018 | Wildner et al. |
| 9,957,190 B2 | 5/2018 | Finkeldey et al. |
| 9,963,374 B2 | 5/2018 | Jouanno et al. |
| 9,972,645 B2 | 5/2018 | Kim |
| 9,975,801 B2 | 5/2018 | Maschmeyer et al. |
| 9,992,888 B2 | 6/2018 | Moon et al. |
| 10,005,246 B2 | 6/2018 | Stepanski |
| 10,017,033 B2 | 7/2018 | Fisher et al. |
| 10,042,391 B2 | 8/2018 | Yun et al. |
| 10,074,824 B2 | 9/2018 | Han et al. |
| 10,086,762 B2 | 10/2018 | Uhm |
| 10,131,118 B2 | 11/2018 | Kang et al. |
| 10,140,018 B2 | 11/2018 | Kim et al. |
| 10,153,337 B2 | 12/2018 | Lee et al. |
| 10,175,802 B2 | 1/2019 | Boggs et al. |
| 10,211,416 B2 | 2/2019 | Jin et al. |
| 10,222,825 B2 | 3/2019 | Wang et al. |
| 10,273,184 B2 | 4/2019 | Garner et al. |
| 10,303,223 B2 | 5/2019 | Park et al. |
| 10,303,315 B2 | 5/2019 | Jeong et al. |
| 10,326,101 B2 | 6/2019 | Oh et al. |
| 10,328,865 B2 | 6/2019 | Jung |
| 10,343,377 B2 | 7/2019 | Levasseur et al. |
| 10,347,700 B2 | 7/2019 | Yang et al. |
| 10,377,656 B2 | 8/2019 | Dannoux et al. |
| 10,421,683 B2 | 9/2019 | Schillinger et al. |
| 10,427,383 B2 | 10/2019 | Levasseur et al. |
| 10,444,427 B2 | 10/2019 | Bookbinder et al. |
| 10,483,210 B2 | 11/2019 | Gross et al. |
| 10,500,958 B2 | 12/2019 | Cho et al. |

(56) References Cited

U.S. PATENT DOCUMENTS

| | | |
|---|---|---|
| 10,606,395 B2 | 3/2020 | Boggs et al. |
| 10,649,267 B2 | 5/2020 | Tuan et al. |
| 10,712,850 B2 | 7/2020 | Brandao et al. |
| 10,732,753 B2 | 8/2020 | Boggs et al. |
| 10,788,707 B2 | 9/2020 | Ai et al. |
| 10,976,607 B2 | 4/2021 | Huang et al. |
| 11,016,590 B2 | 5/2021 | Brandao et al. |
| 2002/0039229 A1 | 4/2002 | Hirose et al. |
| 2004/0026021 A1 | 2/2004 | Groh et al. |
| 2004/0069770 A1 | 4/2004 | Cary et al. |
| 2004/0107731 A1 | 6/2004 | Doehring et al. |
| 2004/0258929 A1 | 12/2004 | Glaubitt et al. |
| 2005/0178158 A1 | 8/2005 | Moulding et al. |
| 2006/0227125 A1 | 10/2006 | Wong et al. |
| 2007/0188871 A1 | 8/2007 | Fleury et al. |
| 2007/0195419 A1 | 8/2007 | Tsuda et al. |
| 2007/0210621 A1 | 9/2007 | Barton et al. |
| 2007/0221313 A1 | 9/2007 | Franck et al. |
| 2007/0223121 A1 | 9/2007 | Franck et al. |
| 2007/0291384 A1 | 12/2007 | Wang |
| 2008/0031991 A1 | 2/2008 | Choi et al. |
| 2008/0093753 A1 | 4/2008 | Schuetz |
| 2008/0285134 A1 | 11/2008 | Closset et al. |
| 2008/0303976 A1 | 12/2008 | Nishizawa et al. |
| 2009/0096937 A1 | 4/2009 | Bauer et al. |
| 2009/0101208 A1 | 4/2009 | Vandal et al. |
| 2009/0117332 A1 | 5/2009 | Ellsworth et al. |
| 2009/0179840 A1 | 7/2009 | Tanaka et al. |
| 2009/0185127 A1 | 7/2009 | Tanaka et al. |
| 2009/0201443 A1 | 8/2009 | Sasaki et al. |
| 2009/0311497 A1 | 12/2009 | Aoki |
| 2010/0000259 A1 | 1/2010 | Ukrainczyk et al. |
| 2010/0031590 A1 | 2/2010 | Buchwald et al. |
| 2010/0065342 A1 | 3/2010 | Shaikh |
| 2010/0103138 A1 | 4/2010 | Huang et al. |
| 2010/0182143 A1 | 7/2010 | Lynam |
| 2010/0245253 A1 | 9/2010 | Rhyu et al. |
| 2011/0057465 A1 | 3/2011 | Beau et al. |
| 2011/0148267 A1 | 6/2011 | Mcdaniel et al. |
| 2012/0050975 A1 | 3/2012 | Garelli et al. |
| 2012/0111056 A1 | 5/2012 | Prest |
| 2012/0128952 A1 | 5/2012 | Miwa et al. |
| 2012/0134025 A1 | 5/2012 | Hart |
| 2012/0144866 A1 | 6/2012 | Liu et al. |
| 2012/0152897 A1 | 6/2012 | Cheng et al. |
| 2012/0196110 A1 | 8/2012 | Murata et al. |
| 2012/0202030 A1 | 8/2012 | Kondo et al. |
| 2012/0218640 A1 | 8/2012 | Gollier et al. |
| 2012/0263945 A1 | 10/2012 | Yoshikawa |
| 2012/0280368 A1 | 11/2012 | Garner et al. |
| 2012/0320509 A1 | 12/2012 | Kim et al. |
| 2013/0020007 A1 | 1/2013 | Niiyama et al. |
| 2013/0033885 A1 | 2/2013 | Oh et al. |
| 2013/0044138 A1* | 2/2013 | Koga .................. G02B 27/01 345/672 |
| 2013/0070340 A1 | 3/2013 | Shelestak et al. |
| 2013/0081428 A1 | 4/2013 | Liu et al. |
| 2013/0088441 A1 | 4/2013 | Chung et al. |
| 2013/0120850 A1 | 5/2013 | Lambert et al. |
| 2013/0186141 A1 | 7/2013 | Henry |
| 2013/0209824 A1 | 8/2013 | Sun et al. |
| 2013/0279188 A1 | 10/2013 | Entenmann et al. |
| 2013/0314642 A1 | 11/2013 | Timmerman et al. |
| 2013/0329346 A1 | 12/2013 | Dannoux et al. |
| 2013/0330495 A1 | 12/2013 | Maatta et al. |
| 2014/0014260 A1 | 1/2014 | Chowdhury et al. |
| 2014/0036428 A1 | 2/2014 | Seng et al. |
| 2014/0065374 A1 | 3/2014 | Tsuchiya et al. |
| 2014/0132407 A1* | 5/2014 | Kumai .................. G08G 1/0962 340/439 |
| 2014/0141206 A1 | 5/2014 | Gillard et al. |
| 2014/0146538 A1 | 5/2014 | Zenker et al. |
| 2014/0153234 A1 | 6/2014 | Knoche et al. |
| 2014/0153894 A1 | 6/2014 | Jenkins et al. |
| 2014/0168153 A1 | 6/2014 | Deichmann et al. |
| 2014/0168546 A1 | 6/2014 | Magnusson et al. |
| 2014/0234581 A1 | 8/2014 | Immerman et al. |
| 2014/0308464 A1 | 10/2014 | Levasseur et al. |
| 2014/0312518 A1 | 10/2014 | Levasseur et al. |
| 2014/0333848 A1 | 11/2014 | Chen |
| 2014/0340609 A1 | 11/2014 | Taylor et al. |
| 2015/0015807 A1 | 1/2015 | Franke et al. |
| 2015/0072129 A1 | 3/2015 | Okahata et al. |
| 2015/0077429 A1 | 3/2015 | Eguchi et al. |
| 2015/0166394 A1 | 6/2015 | Marjanovic et al. |
| 2015/0168768 A1 | 6/2015 | Nagatani |
| 2015/0177443 A1 | 6/2015 | Faecke et al. |
| 2015/0210588 A1 | 7/2015 | Chang et al. |
| 2015/0246424 A1 | 9/2015 | Venkatachalam et al. |
| 2015/0246507 A1 | 9/2015 | Brown et al. |
| 2015/0274585 A1 | 10/2015 | Rogers et al. |
| 2015/0322270 A1 | 11/2015 | Amin et al. |
| 2015/0336357 A1 | 11/2015 | Kang et al. |
| 2015/0351272 A1 | 12/2015 | Wildner et al. |
| 2015/0357387 A1 | 12/2015 | Lee et al. |
| 2016/0009066 A1 | 1/2016 | Nieber et al. |
| 2016/0009068 A1 | 1/2016 | Garner |
| 2016/0016849 A1 | 1/2016 | Allan |
| 2016/0039705 A1 | 2/2016 | Kato et al. |
| 2016/0052241 A1 | 2/2016 | Zhang |
| 2016/0066463 A1 | 3/2016 | Yang et al. |
| 2016/0081204 A1 | 3/2016 | Park et al. |
| 2016/0083282 A1 | 3/2016 | Jouanno et al. |
| 2016/0083292 A1 | 3/2016 | Tabe et al. |
| 2016/0091645 A1 | 3/2016 | Birman et al. |
| 2016/0102015 A1 | 4/2016 | Yasuda et al. |
| 2016/0113135 A1 | 4/2016 | Kim et al. |
| 2016/0207290 A1 | 7/2016 | Cleary et al. |
| 2016/0214889 A1 | 7/2016 | Garner et al. |
| 2016/0216434 A1 | 7/2016 | Shih et al. |
| 2016/0250982 A1 | 9/2016 | Fisher et al. |
| 2016/0252656 A1 | 9/2016 | Waldschmidt et al. |
| 2016/0259365 A1 | 9/2016 | Wang et al. |
| 2016/0272529 A1 | 9/2016 | Hong et al. |
| 2016/0297176 A1 | 10/2016 | Rickerl |
| 2016/0306451 A1 | 10/2016 | Isoda et al. |
| 2016/0313494 A1 | 10/2016 | Hamilton et al. |
| 2016/0354996 A1 | 12/2016 | Alder et al. |
| 2016/0355091 A1 | 12/2016 | Lee et al. |
| 2016/0355901 A1 | 12/2016 | Isozaki et al. |
| 2016/0375808 A1 | 12/2016 | Etienne et al. |
| 2017/0008377 A1 | 1/2017 | Fisher et al. |
| 2017/0021661 A1 | 1/2017 | Pelucchi |
| 2017/0066223 A1 | 3/2017 | Notsu et al. |
| 2017/0081238 A1 | 3/2017 | Jones et al. |
| 2017/0088454 A1 | 3/2017 | Fukushima et al. |
| 2017/0094039 A1 | 3/2017 | Lu |
| 2017/0115944 A1 | 4/2017 | Oh et al. |
| 2017/0126865 A1 | 5/2017 | Lee |
| 2017/0158551 A1 | 6/2017 | Bookbinder et al. |
| 2017/0160434 A1 | 6/2017 | Hart et al. |
| 2017/0185289 A1 | 6/2017 | Kim et al. |
| 2017/0190152 A1 | 7/2017 | Notsu et al. |
| 2017/0197561 A1 | 7/2017 | Mcfarland |
| 2017/0213872 A1 | 7/2017 | Jinbo et al. |
| 2017/0217290 A1 | 8/2017 | Yoshizumi et al. |
| 2017/0217815 A1 | 8/2017 | Dannoux et al. |
| 2017/0240772 A1 | 8/2017 | Dohner et al. |
| 2017/0247291 A1 | 8/2017 | Hatano et al. |
| 2017/0262057 A1 | 9/2017 | Knittl et al. |
| 2017/0263690 A1 | 9/2017 | Lee et al. |
| 2017/0274627 A1 | 9/2017 | Chang et al. |
| 2017/0285227 A1 | 10/2017 | Chen et al. |
| 2017/0305786 A1 | 10/2017 | Roussev et al. |
| 2017/0327402 A1 | 11/2017 | Fujii et al. |
| 2017/0334770 A1 | 11/2017 | Luzzato et al. |
| 2017/0349473 A1 | 12/2017 | Moriya et al. |
| 2018/0009197 A1 | 1/2018 | Gross et al. |
| 2018/0014420 A1 | 1/2018 | Amin et al. |
| 2018/0031743 A1 | 2/2018 | Wakatsuki et al. |
| 2018/0050948 A1 | 2/2018 | Faik et al. |
| 2018/0069053 A1 | 3/2018 | Bok |
| 2018/0072022 A1 | 3/2018 | Tsai et al. |
| 2018/0103132 A1 | 4/2018 | Prushinskiy et al. |

(56) References Cited

U.S. PATENT DOCUMENTS

| | | | |
|---|---|---|---|
| 2018/0111569 A1 | 4/2018 | Faik et al. |
| 2018/0122863 A1 | 5/2018 | Bok |
| 2018/0125228 A1 | 5/2018 | Porter et al. |
| 2018/0134232 A1 | 5/2018 | Helot |
| 2018/0141850 A1 | 5/2018 | Dejneka et al. |
| 2018/0147985 A1 | 5/2018 | Brown et al. |
| 2018/0149777 A1 | 5/2018 | Brown |
| 2018/0149907 A1 | 5/2018 | Gahagan et al. |
| 2018/0164850 A1 | 6/2018 | Sim et al. |
| 2018/0186674 A1 | 7/2018 | Kumar et al. |
| 2018/0188869 A1 | 7/2018 | Boggs et al. |
| 2018/0208131 A1 | 7/2018 | Mattelet et al. |
| 2018/0208494 A1 | 7/2018 | Mattelet et al. |
| 2018/0210118 A1 | 7/2018 | Gollier et al. |
| 2018/0215125 A1 | 8/2018 | Gahagan |
| 2018/0245125 A1 | 8/2018 | Tsai et al. |
| 2018/0304825 A1 | 10/2018 | Mattelet et al. |
| 2018/0324964 A1 | 11/2018 | Yoo et al. |
| 2018/0345644 A1 | 12/2018 | Kang et al. |
| 2018/0364760 A1 | 12/2018 | Ahn et al. |
| 2018/0374906 A1 | 12/2018 | Everaerts et al. |
| 2019/0034017 A1 | 1/2019 | Boggs et al. |
| 2019/0039352 A1 | 2/2019 | Zhao et al. |
| 2019/0039935 A1 | 2/2019 | Couillard et al. |
| 2019/0069451 A1 | 2/2019 | Myers et al. |
| 2019/0077337 A1 | 3/2019 | Gervelmeyer |
| 2019/0152831 A1 | 5/2019 | An et al. |
| 2019/0223309 A1 | 7/2019 | Amin et al. |
| 2019/0295494 A1 | 9/2019 | Wang et al. |
| 2019/0315648 A1 | 10/2019 | Kumar et al. |
| 2019/0329531 A1 | 10/2019 | Brennan et al. |
| 2020/0064535 A1 | 2/2020 | Haan et al. |
| 2020/0301192 A1 | 9/2020 | Huang et al. |
| 2021/0055599 A1 | 2/2021 | Chen et al. |

FOREIGN PATENT DOCUMENTS

| | | |
|---|---|---|
| CN | 101600846 A | 12/2009 |
| CN | 101684032 A | 3/2010 |
| CN | 201989544 U | 9/2011 |
| CN | 102341356 A | 2/2012 |
| CN | 102464456 A | 5/2012 |
| CN | 103136490 A | 6/2013 |
| CN | 103587161 A | 2/2014 |
| CN | 203825589 U | 9/2014 |
| CN | 204111583 U | 1/2015 |
| CN | 102566841 B | 4/2015 |
| CN | 104656999 A | 5/2015 |
| CN | 104679341 A | 6/2015 |
| CN | 204463066 U | 7/2015 |
| CN | 104843976 A | 8/2015 |
| CN | 105118391 A | 12/2015 |
| CN | 105511127 A | 4/2016 |
| CN | 205239166 U | 5/2016 |
| CN | 105705330 A | 6/2016 |
| CN | 106256794 A | 12/2016 |
| CN | 205905907 U | 1/2017 |
| CN | 106458683 A | 2/2017 |
| CN | 206114596 U | 4/2017 |
| CN | 206114956 U | 4/2017 |
| CN | 107613809 A | 1/2018 |
| CN | 107757516 A | 3/2018 |
| CN | 108519831 A | 9/2018 |
| CN | 108550587 A | 9/2018 |
| CN | 108725350 A | 11/2018 |
| CN | 109135605 A | 1/2019 |
| CN | 109690662 A | 4/2019 |
| CN | 109743421 A | 5/2019 |
| DE | 4415787 A1 | 11/1995 |
| DE | 4415878 A1 | 11/1995 |
| DE | 69703490 T2 | 5/2001 |
| DE | 102004022008 A1 | 12/2004 |
| DE | 102004002208 A1 | 8/2005 |
| DE | 102009021938 A1 | 11/2010 |
| DE | 102010007204 A1 | 8/2011 |
| DE | 102013214108 A1 | 2/2015 |
| DE | 102014116798 A1 | 5/2016 |
| EP | 0076924 A2 | 4/1983 |
| EP | 0316224 A1 | 5/1989 |
| EP | 0347049 A2 | 12/1989 |
| EP | 418700 A1 | 3/1991 |
| EP | 423698 A1 | 4/1991 |
| EP | 0525970 A1 | 2/1993 |
| EP | 664210 A1 | 7/1995 |
| EP | 1013622 A1 | 6/2000 |
| EP | 1031409 A1 | 8/2000 |
| EP | 1046493 A2 | 10/2000 |
| EP | 0910721 B1 | 11/2000 |
| EP | 1647663 A1 | 4/2006 |
| EP | 2236281 A1 | 10/2010 |
| EP | 2385630 A2 | 11/2011 |
| EP | 2521118 A2 | 11/2012 |
| EP | 2852502 A2 | 4/2015 |
| EP | 2933718 A1 | 10/2015 |
| EP | 3093181 A2 | 11/2016 |
| EP | 3100854 A1 | 12/2016 |
| EP | 3118174 A1 | 1/2017 |
| EP | 3118175 A1 | 1/2017 |
| EP | 3144141 A1 | 3/2017 |
| EP | 3156286 A1 | 4/2017 |
| EP | 3189965 A1 | 7/2017 |
| EP | 3288791 A1 | 3/2018 |
| EP | 3426614 A1 | 1/2019 |
| EP | 3532442 A1 | 9/2019 |
| FR | 2750075 A1 | 12/1997 |
| FR | 2918411 B1 | 10/2013 |
| FR | 3012073 A1 | 4/2015 |
| GB | 805770 A | 12/1958 |
| GB | 991867 A | 5/1965 |
| GB | 1319846 A | 6/1973 |
| GB | 2011316 A | 7/1979 |
| GB | 2281542 A | 3/1995 |
| JP | 55-154329 | 12/1980 |
| JP | 57-048082 A | 3/1982 |
| JP | 58-073681 A | 5/1983 |
| JP | 58-194751 | 11/1983 |
| JP | 59-076561 A | 5/1984 |
| JP | 63-089317 A | 4/1988 |
| JP | 63-190730 | 8/1988 |
| JP | 3059337 U | 6/1991 |
| JP | 03-228840 A | 10/1991 |
| JP | 04-119931 | 4/1992 |
| JP | 05-116972 A | 5/1993 |
| JP | 06-340029 A | 12/1994 |
| JP | 10-218630 A | 8/1998 |
| JP | 11-001349 A | 1/1999 |
| JP | 11-006029 A | 1/1999 |
| JP | 11-060293 A | 3/1999 |
| JP | 2000-260330 A | 9/2000 |
| JP | 2002-255574 A | 9/2002 |
| JP | 2003-500260 A | 1/2003 |
| JP | 2003-276571 A | 10/2003 |
| JP | 2003-321257 A | 11/2003 |
| JP | 2004-101712 A | 4/2004 |
| JP | 2004-284839 A | 10/2004 |
| JP | 2006-181936 A | 7/2006 |
| JP | 2007-188035 A | 7/2007 |
| JP | 2007-197288 A | 8/2007 |
| JP | 2010-145731 A | 7/2010 |
| JP | 2012-111661 A | 6/2012 |
| JP | 2013-084269 A | 5/2013 |
| JP | 2014-126564 A | 7/2014 |
| JP | 2015-502901 A | 1/2015 |
| JP | 2015092422 A | 5/2015 |
| JP | 5748082 B2 | 7/2015 |
| JP | 2015-162184 A | 9/2015 |
| JP | 5796561 B2 | 10/2015 |
| JP | 2016-500458 A | 1/2016 |
| JP | 2016031696 A | 3/2016 |
| JP | 2016-517380 A | 6/2016 |
| JP | 2016-130810 A | 7/2016 |
| JP | 2016-144008 A | 8/2016 |
| JP | 05976561 B2 | 8/2016 |
| JP | 2016-530204 A | 9/2016 |

(56) References Cited

FOREIGN PATENT DOCUMENTS

| | | |
|---|---|---|
| JP | 2016173794 A | 9/2016 |
| JP | 2016-207200 A | 12/2016 |
| JP | 2016203609 A | 12/2016 |
| JP | 6281825 B2 | 2/2018 |
| JP | 6340029 B2 | 6/2018 |
| KR | 2002-0019045 A | 3/2002 |
| KR | 10-0479282 B1 | 8/2005 |
| KR | 10-2008-0023888 A | 3/2008 |
| KR | 10-2013-0005776 A | 1/2013 |
| KR | 10-2014-0111403 A | 9/2014 |
| KR | 10-2015-0026911 A | 3/2015 |
| KR | 10-2015-0033969 A | 4/2015 |
| KR | 10-2015-0051458 A | 5/2015 |
| KR | 10-1550833 B1 | 9/2015 |
| KR | 10-2015-0121101 A | 10/2015 |
| KR | 10-2016-0118746 A | 10/2016 |
| KR | 10-1674060 B1 | 11/2016 |
| KR | 10-2016-0144008 A | 12/2016 |
| KR | 10-2017-0000208 A | 1/2017 |
| KR | 10-2017-0106263 A | 9/2017 |
| KR | 10-2017-0107124 A | 9/2017 |
| KR | 10-2017-0113822 A | 10/2017 |
| KR | 10-2017-0121674 A | 11/2017 |
| KR | 10-2018-0028597 A | 3/2018 |
| KR | 10-2018-0049484 A | 5/2018 |
| KR | 10-2018-0049780 A | 5/2018 |
| KR | 10-2019-0001864 A | 1/2019 |
| KR | 10-2019-0081264 A | 7/2019 |
| TW | 200704268 A | 1/2007 |
| TW | 201438895 A | 10/2014 |
| TW | 201546006 A | 12/2015 |
| TW | 201636309 A | 10/2016 |
| TW | 201637857 A | 11/2016 |
| VN | 58334 | 7/2018 |
| WO | 94/25272 A1 | 11/1994 |
| WO | 97/39074 A1 | 10/1997 |
| WO | 9801649 A1 | 1/1998 |
| WO | 00/73062 A1 | 12/2000 |
| WO | 2006/095005 A1 | 9/2006 |
| WO | 2007108861 A1 | 9/2007 |
| WO | 2008/042731 A1 | 4/2008 |
| WO | 2008/153484 A1 | 12/2008 |
| WO | 2009/072530 A1 | 6/2009 |
| WO | 2011/029852 A1 | 3/2011 |
| WO | 2011/144359 A1 | 11/2011 |
| WO | 2011/155403 A1 | 12/2011 |
| WO | 2012/005307 A1 | 1/2012 |
| WO | 2012058084 A2 | 5/2012 |
| WO | 2012/166343 A2 | 12/2012 |
| WO | 2013/072611 A1 | 5/2013 |
| WO | 2013/072612 A1 | 5/2013 |
| WO | 2013/174715 A1 | 11/2013 |
| WO | 2013/175106 A2 | 11/2013 |
| WO | 2014/085663 A1 | 6/2014 |
| WO | 2014/107640 A1 | 7/2014 |
| WO | 2014/172237 A2 | 10/2014 |
| WO | 2014/175371 A1 | 10/2014 |
| WO | 2015031594 A2 | 3/2015 |
| WO | 2015/055583 A1 | 4/2015 |
| WO | 2015/057552 A2 | 4/2015 |
| WO | 2015/085283 A1 | 6/2015 |
| WO | 2015084902 A1 | 6/2015 |
| WO | 2015/141966 A1 | 9/2015 |
| WO | 2016/007815 A1 | 1/2016 |
| WO | 2016/007843 A1 | 1/2016 |
| WO | 2016/010947 A1 | 1/2016 |
| WO | 2016/010949 A1 | 1/2016 |
| WO | 2016044360 A1 | 3/2016 |
| WO | 2016/069113 A1 | 5/2016 |
| WO | 2016/070974 A1 | 5/2016 |
| WO | 2016/115311 A1 | 7/2016 |
| WO | 2016/125713 A1 | 8/2016 |
| WO | 2016136758 A1 | 9/2016 |
| WO | 2016/173699 A1 | 11/2016 |
| WO | 2016/183059 A1 | 11/2016 |
| WO | 2016/195301 A1 | 12/2016 |
| WO | 2016/202605 A1 | 12/2016 |
| WO | 2016196531 A1 | 12/2016 |
| WO | 2016196546 A1 | 12/2016 |
| WO | 2017/015392 A1 | 1/2017 |
| WO | 2017/019851 A1 | 2/2017 |
| WO | 2017023673 A1 | 2/2017 |
| WO | 2017/106081 A1 | 6/2017 |
| WO | 2017/146866 A1 | 8/2017 |
| WO | 2017/158031 A1 | 9/2017 |
| WO | 2017155932 A1 | 9/2017 |
| WO | 2018/015392 A1 | 1/2018 |
| WO | 2018005646 A1 | 1/2018 |
| WO | 2018009504 A1 | 1/2018 |
| WO | 2018075853 A1 | 4/2018 |
| WO | 2018081068 A1 | 5/2018 |
| WO | 2018/102332 A1 | 6/2018 |
| WO | 2018125683 A1 | 7/2018 |
| WO | 2018/160812 A2 | 9/2018 |
| WO | 2018/200454 A1 | 11/2018 |
| WO | 2018/200807 A1 | 11/2018 |
| WO | 2018/213267 A1 | 11/2018 |
| WO | 2019/055469 A1 | 3/2019 |
| WO | 2019/055652 A1 | 3/2019 |
| WO | 2019/074800 A1 | 4/2019 |
| WO | 2019/075065 A1 | 4/2019 |
| WO | 2019/151618 A1 | 8/2019 |

OTHER PUBLICATIONS

Qilin Zhang, "Glass Curtain Wall Structure Design", Tongji University Press, 2007, 8 pages. (5 pages of English Translation and 3 pages of original Document).

Belis et al; "Cold Bending of Laminated Glass Panels"; Heron, vol. 52 (2007); No. 1/2; pp. 123-146.

Fauercia "Intuitive HMI for a Smart Life on Board" 2018); 8 Pages http://www.faurecia.com/en/innovation/smart-life-board/intuitive-HMI.

Galuppi et al; "Buckling Phenomena in Double Curved Cold-Bent Glass;" Intl. J. Non-Linear Mechanics 64 (2014) pp. 70-84.

Galuppi et al; "Optimal Cold Bending of Laminated Glass"; International Journal of Solids and Structures; 67-68 (2015) pp. 231-243.

International Search Report and Written Opinion of the International Searching Authority; PCT/US2017/021069 dated Jun. 20, 2017; 19 Pages; European Patent Office.

International Search Report and Written Opinion of the International Searching Authority; PCT/US2017/042606 dated Nov. 17, 2017; 18 Pages; European Patent Office.

Pegatron Corp. "Pegaton Navigate the Future"; Ecockpit/Center Cnsole Work Premiere Automotive World; Downloaded Jul. 12, 2017; 2 Pages.

Vakar et al; "Cold Bendable, Laminated Glass-New Possibilities in Design"; Structural Engineering International; Feb. 2004; Structural Design in Glass; pp. 95-97.

"Corning® Gorilla® Glass for Automotive Featured in Curved Cover Lens Applications at the Paris Motor Show"; Corning Incorporated; Sep. 30, 2016; 3 Pages; http://www.corning.com/worldwide/en/about-us/news-events/news-releases/2016/09/corning-gorilla-glass-for-automotive-featured-in-curved-cover-lens-applications-at-the-paris-motor-show.html.

Japanese Patent Application No. 2020-502678, Office Action dated Jul. 21, 2021, 12 pages (7 pages of English Translation and 12 pages of Original Document), Japanese Patent Office.

Taiwanese Patent Application No. 106123977, Search Report dated Feb. 9, 2021, 2 pages (English Translation Only); Taiwanese Patent Office.

Faurecia: Smart Pebbles, Nov. 10, 2016 (Nov. 10, 2016), XP055422209, Retrieved from the Internet: URL:https://web.archive.org/web/20171123002248/http://www.faurecia.com/en/innovation/discover-our-innovations/smart-pebbles [retrieved on Nov. 23, 2017].

International Search Report and Written Opinion of the International Searching Authority; PCT/US2018/012215 dated Aug. 1, 2018; 21 Pgs; European Patent Office.

(56) References Cited

OTHER PUBLICATIONS

International Search Report and Written Opinion of the International Searching Authority; PCT/US2018/041062 dated Nov. 13, 2018; 15 Pgs; European Patent Office.
Invitation To Pay Additional Fees of the International Searching Authority PCT/US2018/012215; dated May 11, 2018; 13 Pages; European Patent Office.
Chinese Patent Application No. 201780016307.2, Office Action dated Mar. 15, 2021, 11 pages (English Translation Only); Chinese Patent Office.
European Patent Application No. 17712334.6, Office Action dated Apr. 13, 2021; 6 pages; European Patent Office.
Japanese Patent Application No. 2018-546626, Office Action dated Feb. 24, 2021, 10 pages (5 pages of English Translation and 5 pages of Original Document); Japanese Patent Office.
Author Unknown; "Stress Optics Laboratory Practice Guide" 2012; 11 Pages.
Chinese Patent Application No. 201780016307.2, Office Action dated Nov. 4, 2020, 11 pages (English Translation Only); Chinese Patent Office.
Doyle et al; "Manual on Experimental Stress Analysis"; Fifth Edition, Society for Experimental Mechanics; Unknown Year; 31 Pages.
Elziere; "Laminated Glass: Dynamic Rupture of Adhesion"; Polymers; Universite Pierre et Marie Curie—Paris VI, 2016. English; 181 Pages.
Fildhuth et al; "Considerations Using Curved, Heat or Cold Bent Glass for Assembling Full Glass Shells", Engineered Transparency, International Conference at Glasstec, Dusseldorf, Germany, Oct. 25 and 26, 2012; 11 Pages.
Fildhuth et al; "Interior Stress Monitoring of Laminated Cold Bent Glass With Fibre Bragg Sensors", Challenging Glass 4 & Cost Action TU0905 Final Conference Louter, Bos & Belis (Eds), 2014; 8 Pages.
Fildhuth et al; "Layout Strategies and Optimisation of Joint Patterns in Full Glass Shells", Challenging Glass 3—Conference on Architectural and Structural Applications of Glass, Bos, Louter, Nijsse, Veer (Eds.), Tu Delft, Jun. 2012; 13 Pages.
Fildhuth et al; "Recovery Behaviour of Laminated Cold Bent Glass—Numerical Analysis and Testing"; Challenging Glass 4 & Cost Action TU0905 Final Conference—Louter, Bos & Beus (eds) (2014); 9 Pages.
Fildhuth; "Design and Monitoring of Cold Bent Lamination—Stabilised Glass"; ITKE 39 (2015) 270 Pages.
Galuppi et al; "Cold-Lamination-Bending of Glass: Sinusoidal is Better Than Circular", Composites Part B 79 (2015) 285-300.
Millard; "Bending Glass in the Parametric Age"; Enclos; (2015); pp. 1-6; http://www.enclos.com/site-info/news/bending-glass-in-the-parametric-age.
Neugebauer et al; "Let Thin Glass in the Faade Move Thin Glass—New Possibilities for Glass in the Faade", Conference Paper Jun. 2018; 12 Pages.
Weijde; "Graduation Plan"; Jan. 2017; 30 Pages.
Werner; "Display Materials and Processes," Information Display; May 2015; 8 Pages.
"Stainless Steel—Grade 410 (UNS S41000)", available online at <https://www.azom.com/article.aspx?ArticleID=970>, Oct. 23, 2001, 5 pages.
"Standard Test Method for Measurement of Glass Stress—Optical Coefficient", ASTM International, Designation: C770-16, 2016.
Ashley Klamer, "Dead front overlays", Marking Systems, Inc., Jul. 8, 2013, 2 pages.

ASTM C1279-13 "Standard Test Method for Non-Destructive Photoelastic Measurement of Edge and Surface Stresses in Annealed, Heat-Strengthened, and Fully Tempered Flat Glass"; Downloaded Jan. 24, 2018; 11 Pages.
ASTM C1422/C1422M-10 "Standard Specification for Chemically Strengthened Flat Glass"; Downloaded Jan. 24, 2018; 5 pages.
ASTM Standard C770-98 (2013), "Standard Test Method for Measurement of Glass Stress-Optical Coefficient".
Burchardt et al., (Editorial Team), Elastic Bonding: The basic principles of adhesive technology and a guide to its cost-effective use in industry, 2006, 71 pages.
Byun et al; "A Novel Route for Thinning of LCD Glass Substrates"; SID 06 Digest; pp. 1786-1788, v37, 2006.
Datsiou et al., "Behaviour of cold bent glass plates during the shaping process", Engineered Transparency. International Conference atglasstec, Dusseldorf, Germany, Oct. 21 and 22, 2014, 9 pages.
Engineering ToolBox, "Coefficients of Linear Thermal Expansion", available online at <https://www.engineeringtoolbox.com/linear-expansion-coefficients-d_95.html>, 2003, 9 pages.
Ferwerda et al., "Perception of sparkle in anti-glare display screens", Journal of the SID, vol. 22, Issue 2, 2014, pp. 129-136.
Galuppi et al; "Large Deformations and Snap-Through Instability of Cold-Bent Glass"; Challenging Glass 4 & Cost Action TU0905 Final Conference; (2014) pp. 681-689.
Galuppi L et al: "Optimal cold bending of laminated glass", Jan. 1, 2007 vol. 52, No. 1/2 Jan. 1, 2007 (Jan. 1, 2007), pp. 123-146.
Gollier et al., "Display Sparkle Measurement and Human Response", SID Symposium Digest of Technical Papers, vol. 44, Issue 1, 2013, pp. 295-297.
Indian Patent Application No. 201917031293 Office Action dated May 24, 2021; 6 pages; Indian Patent Office.
Jalopnik, "This Touch Screen Car Interior is a Realistic Vision of the Near Future", jalopnik.com, Nov. 19, 2014, https://jalopnik.com/this-touch-screen-car-interior-is-a-realistic-vision-of-1660846024 (Year: 2014).
Li et al., "Effective Surface Treatment on the Cover Glass for Autointerior Applications", SID Symposium Digest of Technical Papers, vol. 47, 2016, pp. 467-469.
Pambianchi et al; "Corning Incorporated: Designing a New Future With Glass and Optics"; Chapter 1 in "Materials Research for Manufacturing: An Industrial Perspective of Turning Materials Into New Products"; Springer Series Material Science 224, p. 12 (2016).
Photodon, "Screen Protectors for Your Car's Navi System That You're Gonna Love", photodon.com, Nov. 6, 2015, https://www.photodon.com/blog/archives/screen-protectors-for-your-cars-navi-system-that-youre-gonna-love) (Year: 2015).
Product Information Sheet: Corning® Gorilla® Glass 3 with Native Damage Resistance™, Corning Incorporated, 2015, Rev: F_090315, 2 pages.
Scholze, H., "Glass-Water Interactions", Journal of Non-Crystalline Solids vol. 102, Issues 1-3, Jun. 1, 1988, pp. 1-10.
Stattler; "New Wave-Curved Glass Shapes Design"; Glass Magazine; (2013); 2 Pages.
Stiles Custom Metal, Inc., Installation Recommendations, 2010 https://stilesdoors.com/techdata/pdf/Installation%20Recommendations%20HM%20Windows,%20Transoms%20&%>OSidelites%200710.pdf) (Year: 2010).
Tomozawa et al., "Hydrogen-to-Alkali Ratio in Hydrated Alkali Aluminosilicate Glass Surfaces", Journal of Non-Crystalline Solids, vol. 358, Issue 24, Dec. 15, 2012, pp. 3546-3550.
Zhixin Wang, Polydimethylsiloxane mechanical properties measured by macroscopic compression and nanoindentation techniques, Graduate Theses and Dissertations, University of South Florida, 2011, 79 pages.

* cited by examiner

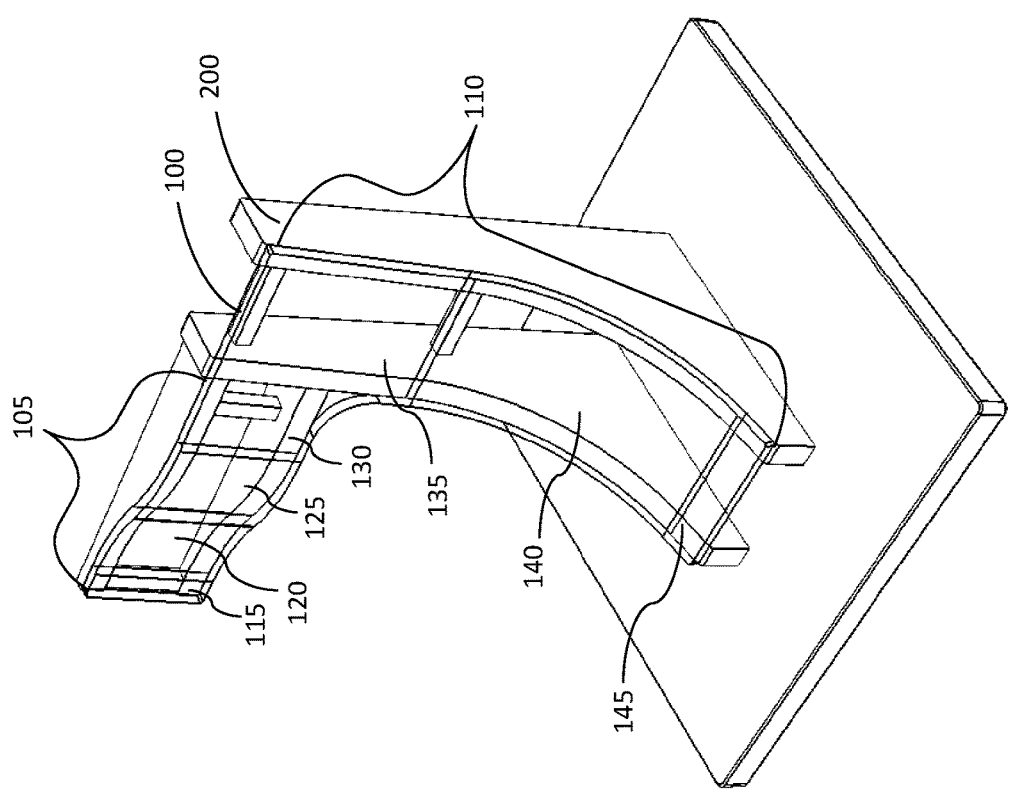

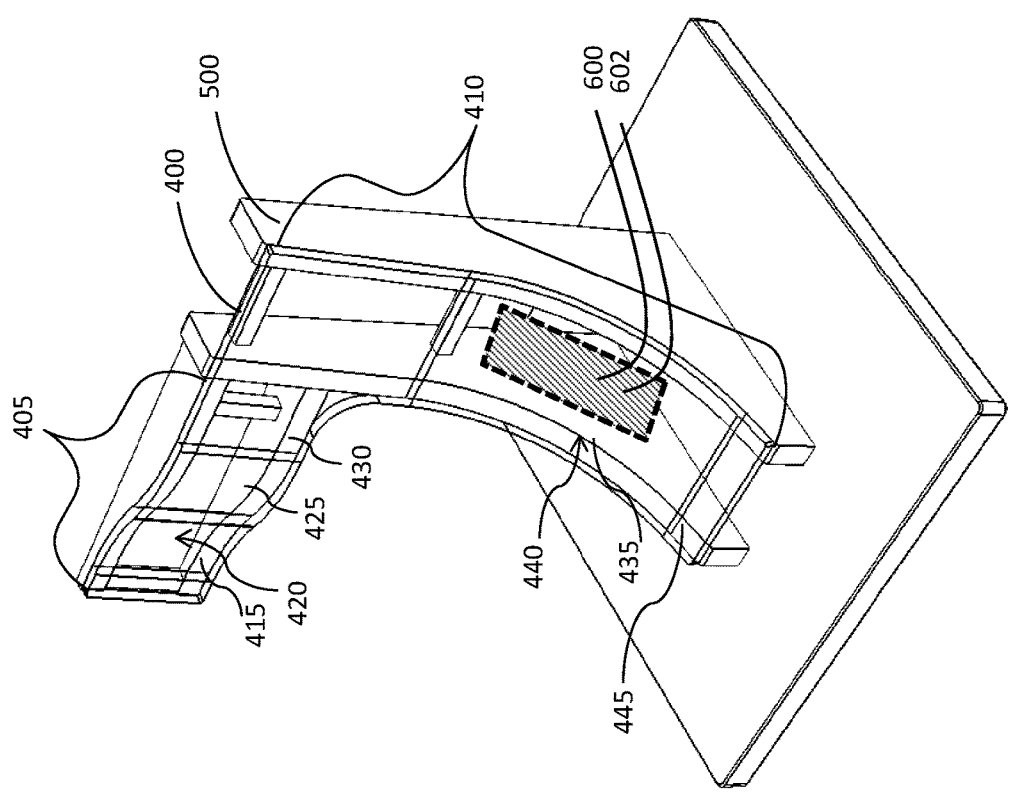

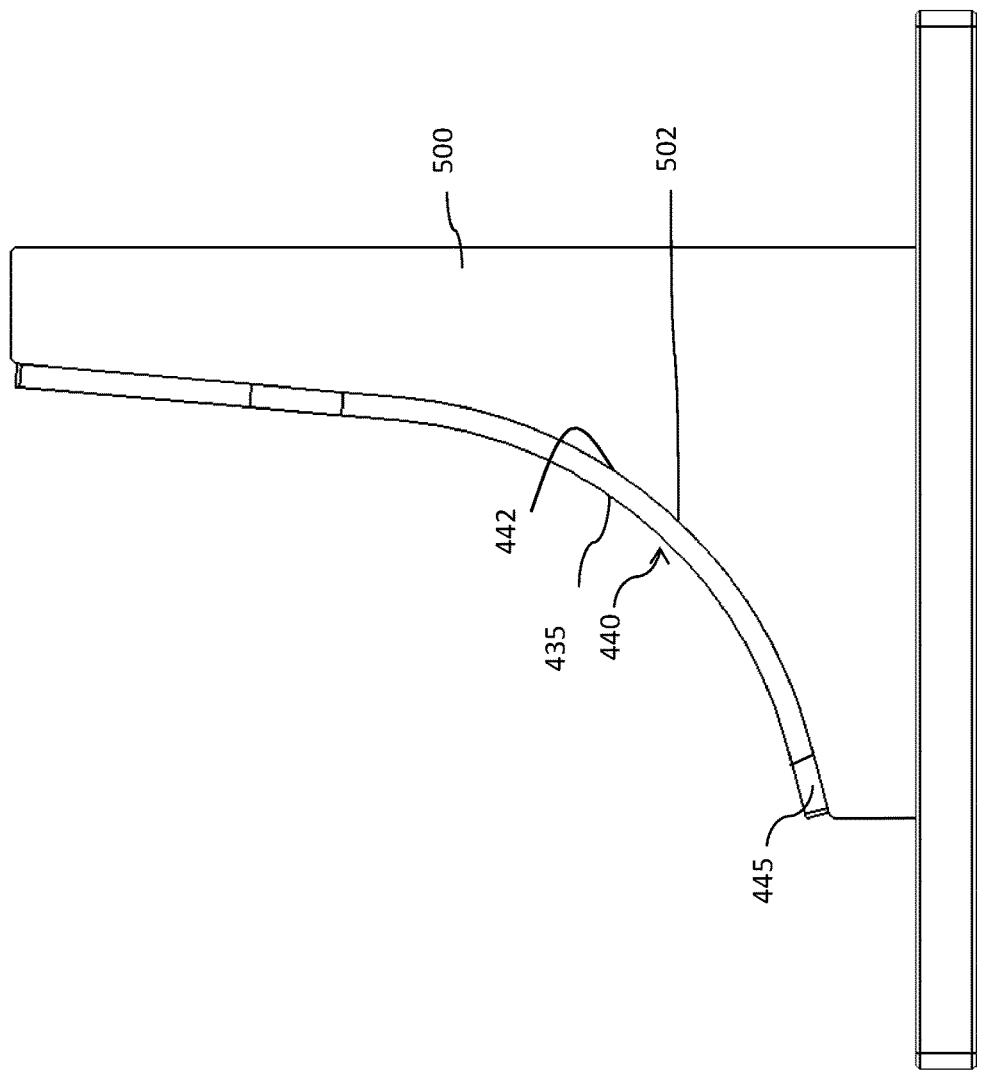

COLD FORMING OF COMPLEXLY CURVED GLASS ARTICLES

CROSS-REFERENCE TO RELATED APPLICATIONS

Cross Reference to This application is a national stage entry of International Patent Application Serial No. PCT/US17/42606 filed on Jul. 18, 2017.

Principles and embodiments of the present disclosure relate generally to complexly curved glass articles, methods of cold forming complexly curved glass articles, and vehicle systems that include a complexly curved glass article.

BACKGROUND

Vehicle manufactures are creating interiors that better connect, protect and safely inform today's drivers and passengers. As the industry moves towards autonomous driving, there is a need for creating large format appealing displays. There is already a trend towards larger displays including touch functionality in the new models from several OEMs. However, most of these displays consist of two dimensional plastic cover lens.

Due to these emerging trends in the automotive interior industry and related industries, there is a need to develop a low cost technology to make three-dimensional transparent surfaces. Of further interest is the development of automotive interior parts that includes bends in different directions, while maintaining complete independence between the bends.

One of the approaches that could be utilized to make three-dimensional automotive interior display surfaces is by utilizing plastics. Plastic materials could be shaped in a three-dimensional mold including multi-axis bends; however, glass is advantaged compared to plastics in several respects. In particular, plastics materials are prone to permanent damage during blunt impact, general wear, and UV exposure.

Three-dimensional glass surfaces are conventionally formed via hot forming process. The process also is capable for forming three-dimensional automotive interior displays that are curved in more than one direction. Such glass bending methods involve heating the glass sheet and forming the sheet while it is still in a high temperature state at or near the softening temperature of the glass.

However, hot forming processes are energy intensive due to the high temperatures involved and such processes add significant cost to the product. Furthermore, there is a need to provide anti-reflective coatings or other coatings on automotive interior display surfaces. Providing such coatings uniformly on a three-dimensional surface utilizing vapor deposition techniques is very challenging and further adds to the cost of the process.

Cold forming processes, which may also be referred to as cold bending has been utilized to address some of the aforementioned issues. However, cold bending has been limited to bends or curvatures along one axis only. The anticlastic glass configuration that involves having opposite curvatures at one point is severely limited to large bend radius (1 m or higher) and mostly finds use for architectural or building applications. Cold bending procedure induces a permanent strain, and consequently a permanent stress, in the glass pane.

Therefore, there is a need for new complexly curved glass articles and methods of making the same that can be used in automotive interiors and other applications.

SUMMARY

A solution to at least one of the above issues involves glass articles having complexly curved shapes formed by cold forming. One aspect of the disclosure pertains to a complexly curved glass article that has been formed by a cold forming process. A second aspect of the disclosure pertains to a method for forming a complexly curved glass article using a cold forming process. According to one or more embodiments, the cold forming process is a cold bending process utilizing a preform with a first bend region having a set of first bend line segments, and a second bend region having a set of second bend line segments, wherein the first bend line segments and the second bend line segments are independent, are not parallel, and do not intersect. In various embodiments, the glass article is a laminate comprising at least two substrates, and the cold forming process is performed at a temperature below the glass transition temperature of either of the substrates that are used to form the laminate. Accordingly, the methods described herein do not require heating to at or near the glass transition temperature of the glass, thus reducing manufacturing time and cost by avoiding heating operations for the glass substrate.

Another aspect of the disclosure pertains to a vehicle interior component comprising the complexly curved glass article. Yet another aspect of the disclosure pertains to a vehicle comprising the vehicle interior component.

Various embodiments are listed below. It will be understood that the embodiments listed below may be combined not only as listed below, but in other suitable combinations in accordance with the scope of the disclosure.

BRIEF DESCRIPTION OF THE DRAWINGS

Further features of embodiment of the present disclosure, their nature and various advantages will become more apparent upon consideration of the following detailed description, taken in conjunction with the accompanying drawings, which are also illustrative of the best mode contemplated by the applicants, and in which like reference characters refer to like parts throughout, where:

FIG. 1A is a perspective view of a preform and a glass article having multiple bend regions;

FIG. 4A illustrates a perspective view of a one or more embodiments of a vehicle interior system;

FIG. 4C illustrates a side view of the vehicle interior system of FIG. 4A.

DETAILED DESCRIPTION

Figure 1B:
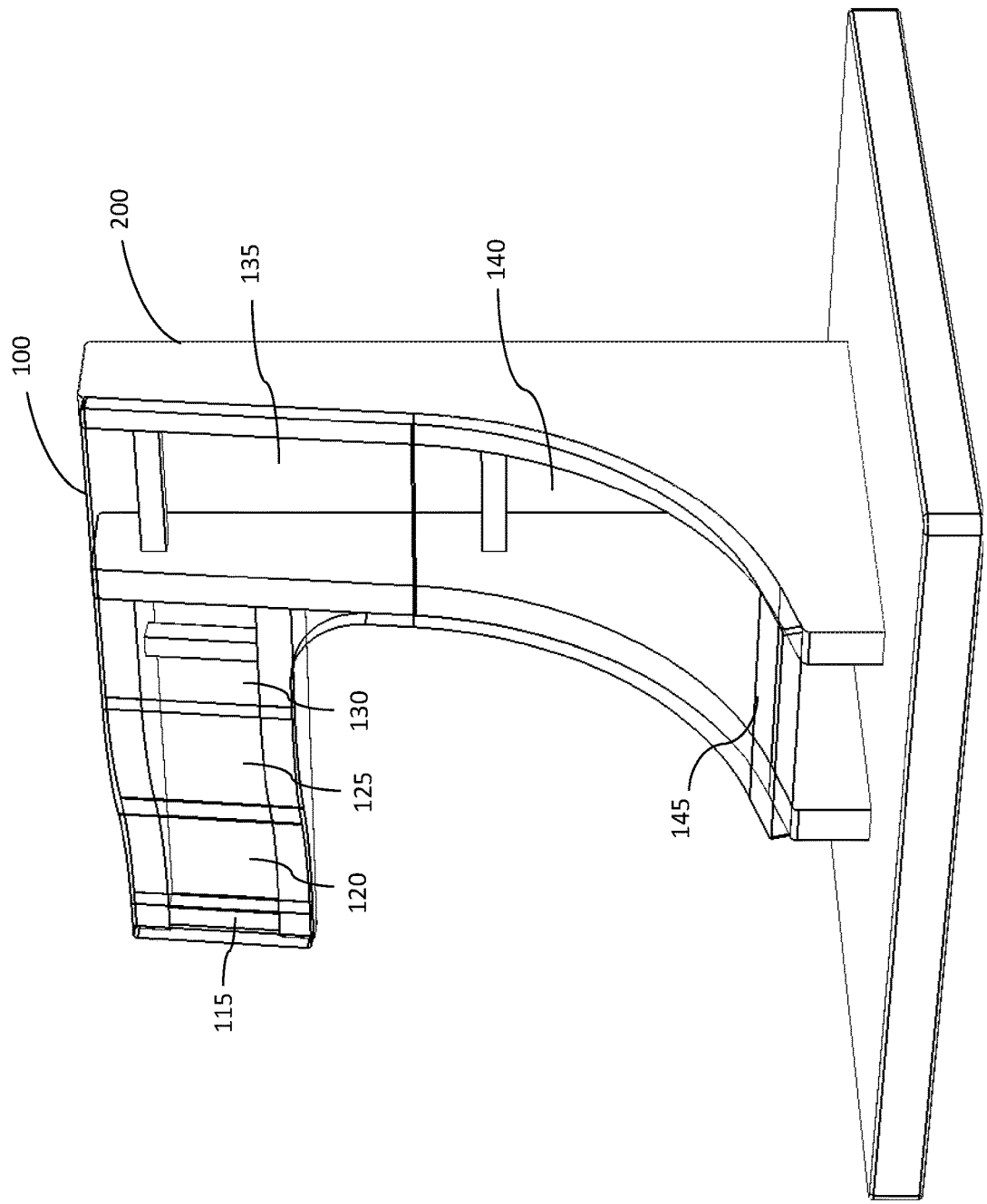
FIG. 1B is another perspective view of the preform and glass article having multiple bend regions shown in FIG. 1A.
Figure 1C:
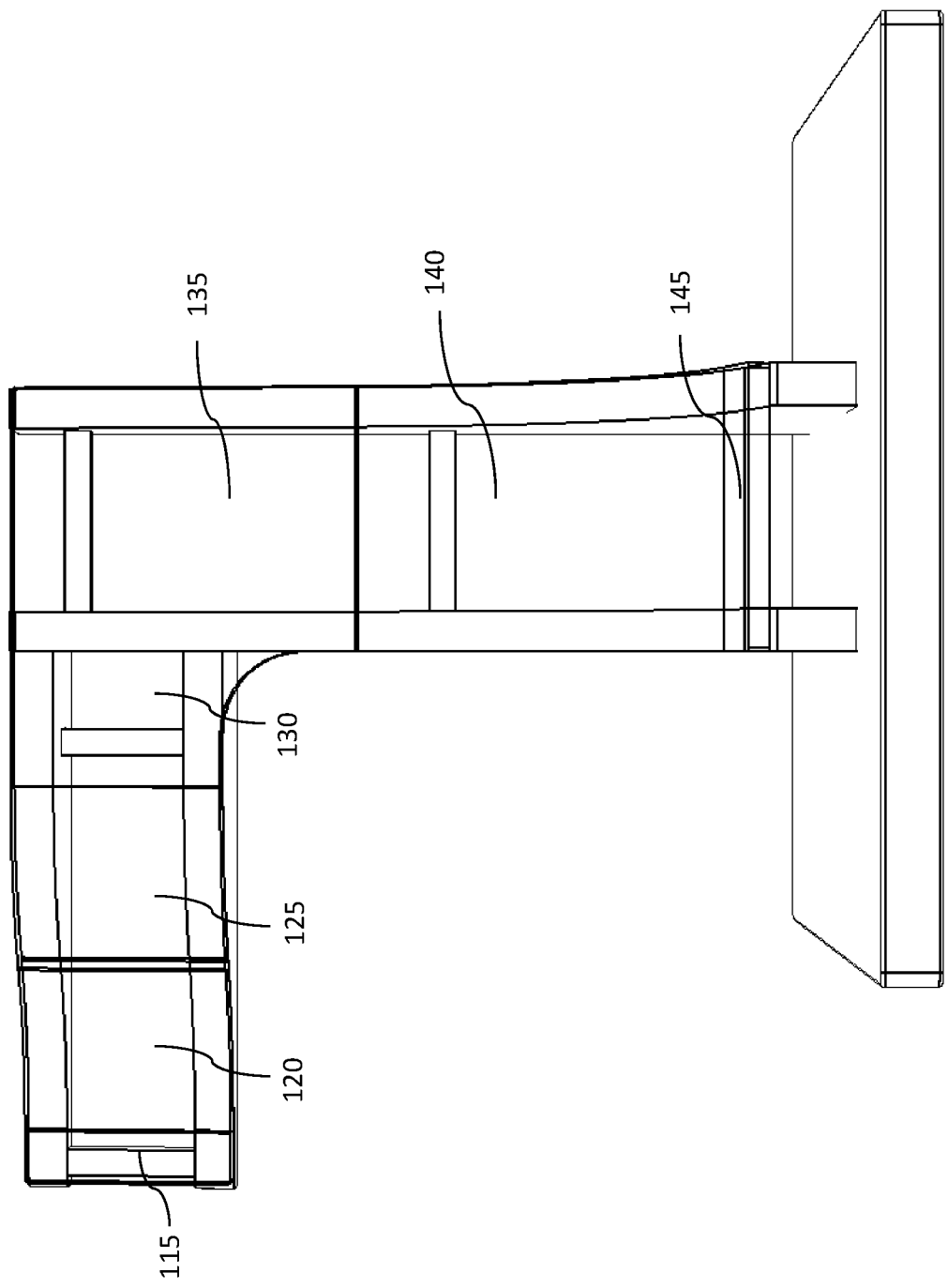
FIG. 1C is a front view of the preform and glass article having multiple bend regions shown in FIG. 1A.
Figure 1D:
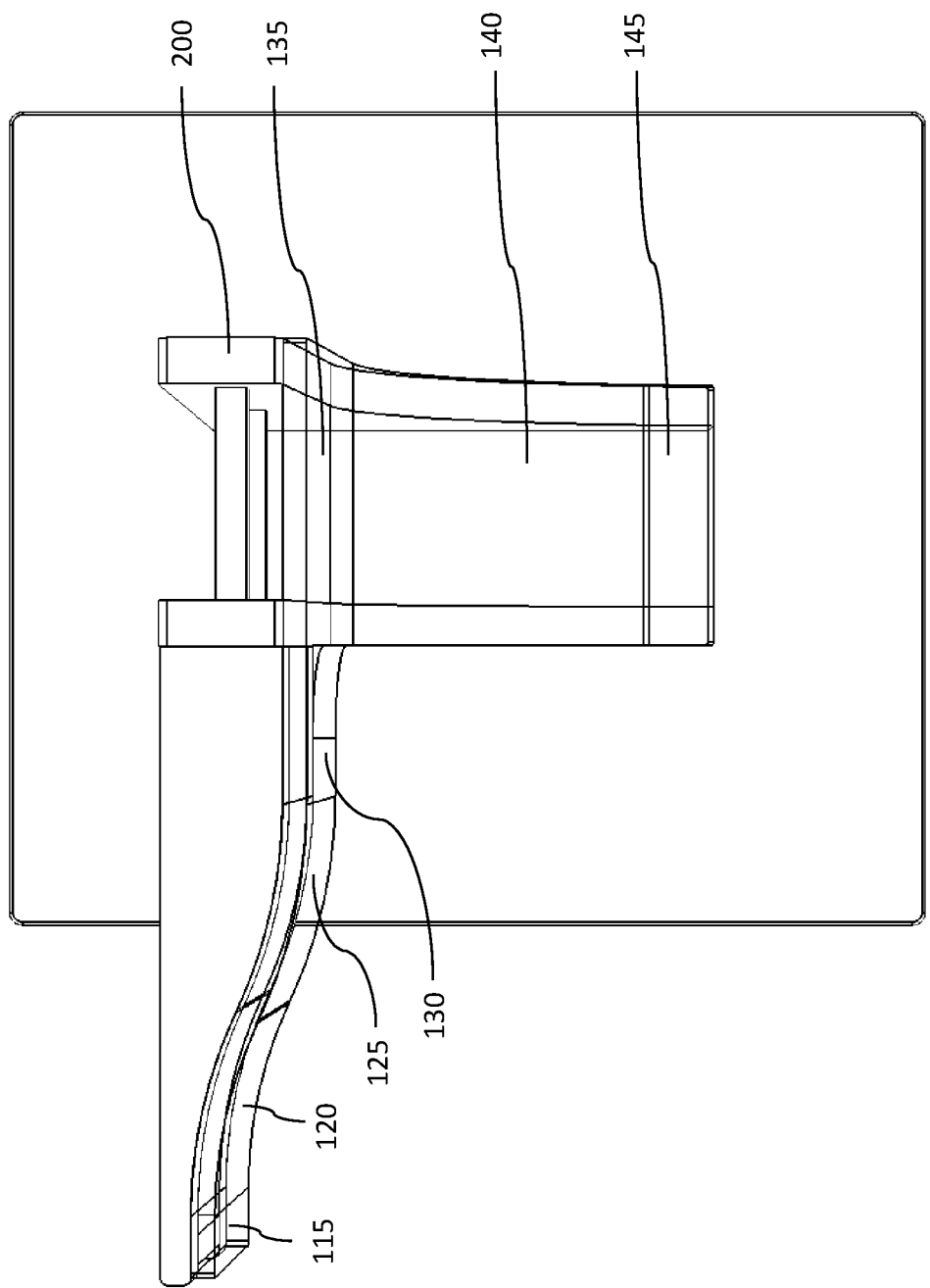
FIG. 1D is a top view of the preform and glass article having multiple bend regions shown in FIG. 1A.
Figure 1E:
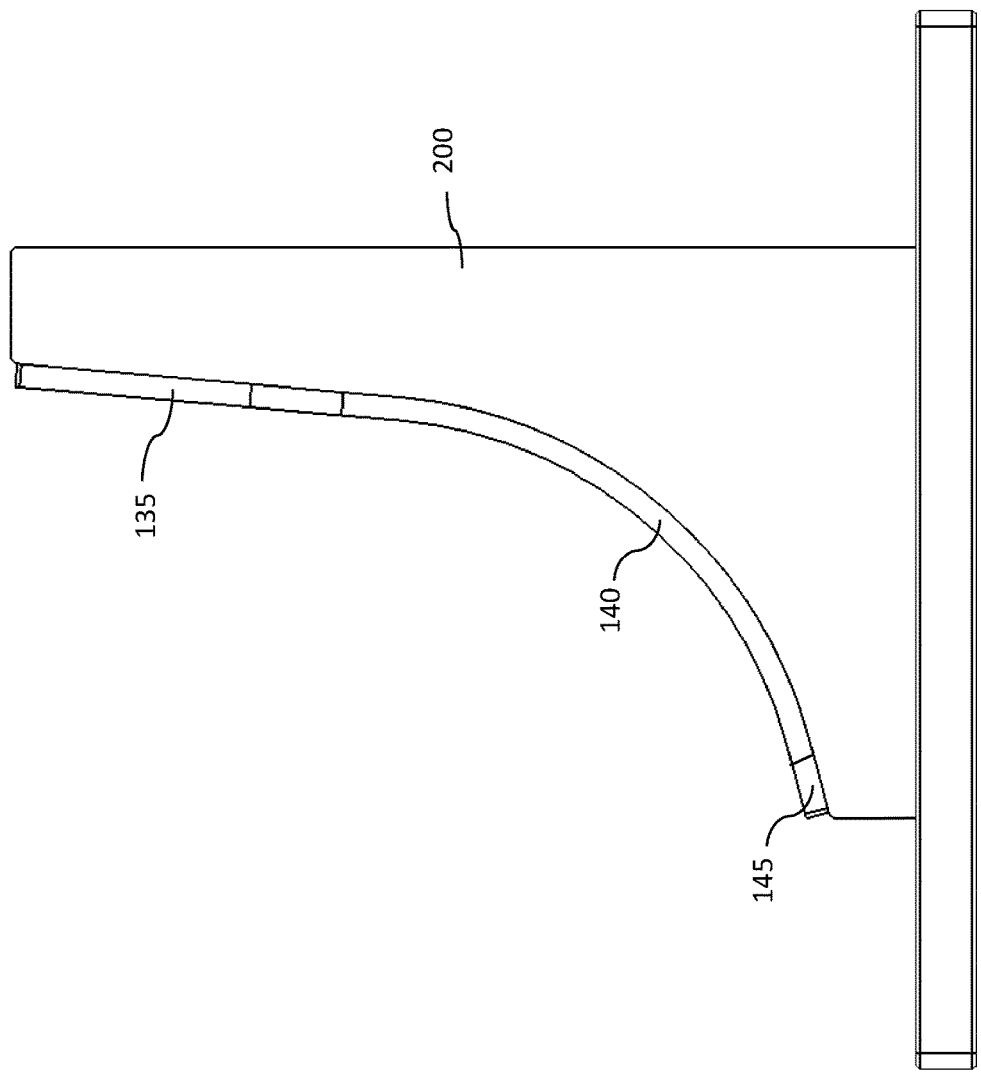
FIG. 1E is a side view of the preform and glass article having multiple bend regions shown in FIG. 1A.
Figure 1F:
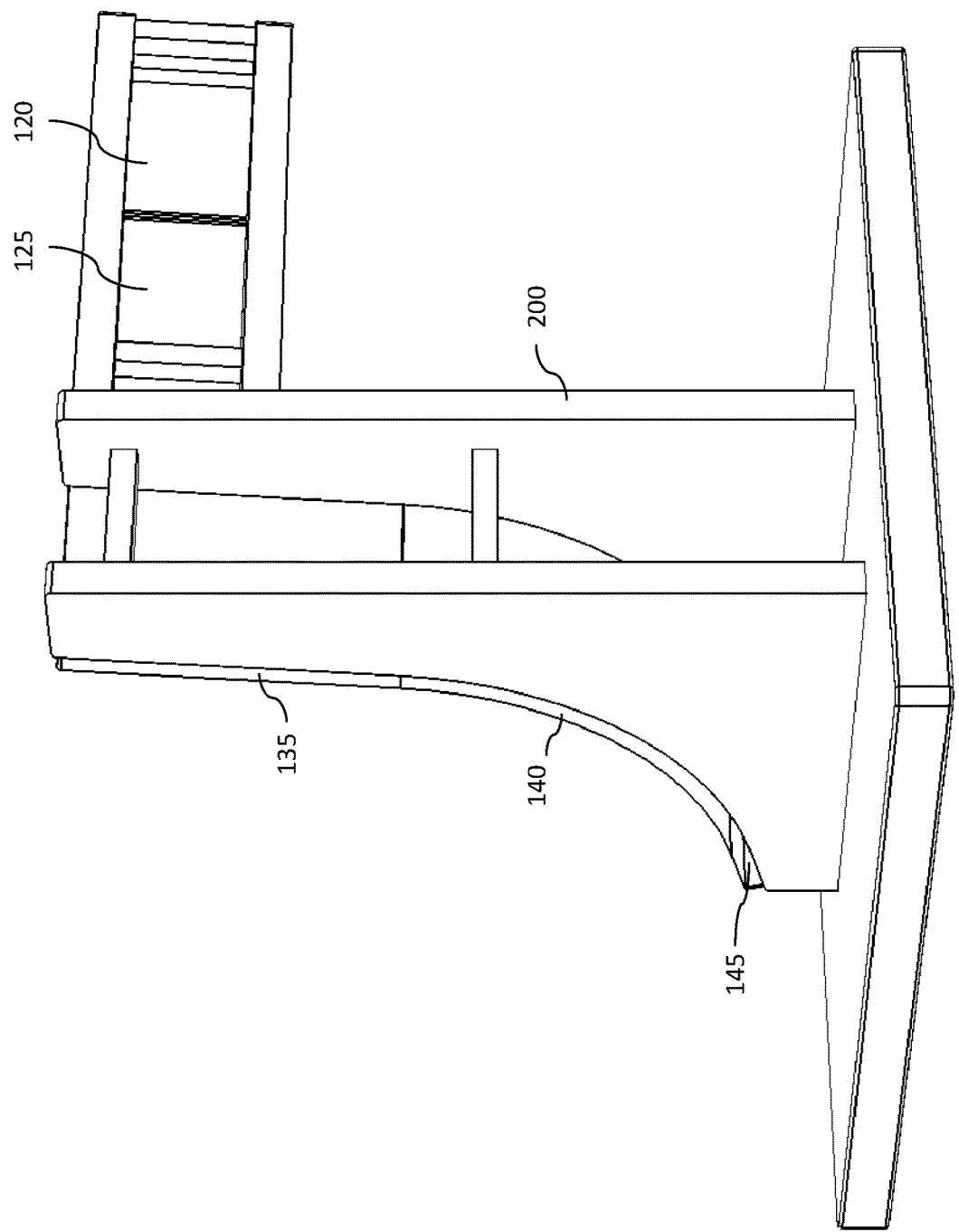
FIG. 1F is a rear perspective view of the preform and glass article having multiple bend regions shown in FIG. 1A.
Figure 1G:
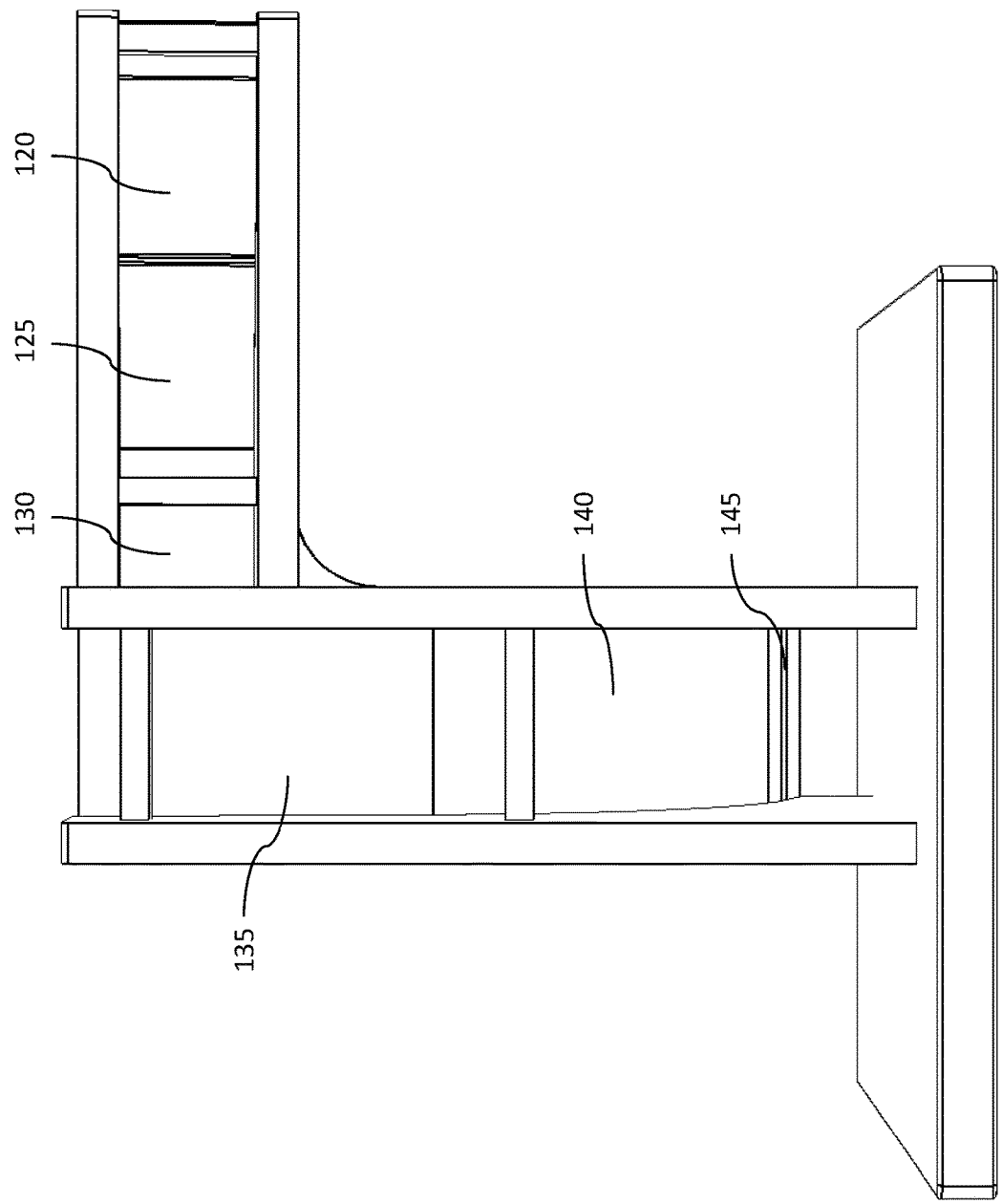
FIG. 1G is a rear view of the preform and glass article having multiple bend regions shown in FIG. 1A.
Figure 2A:
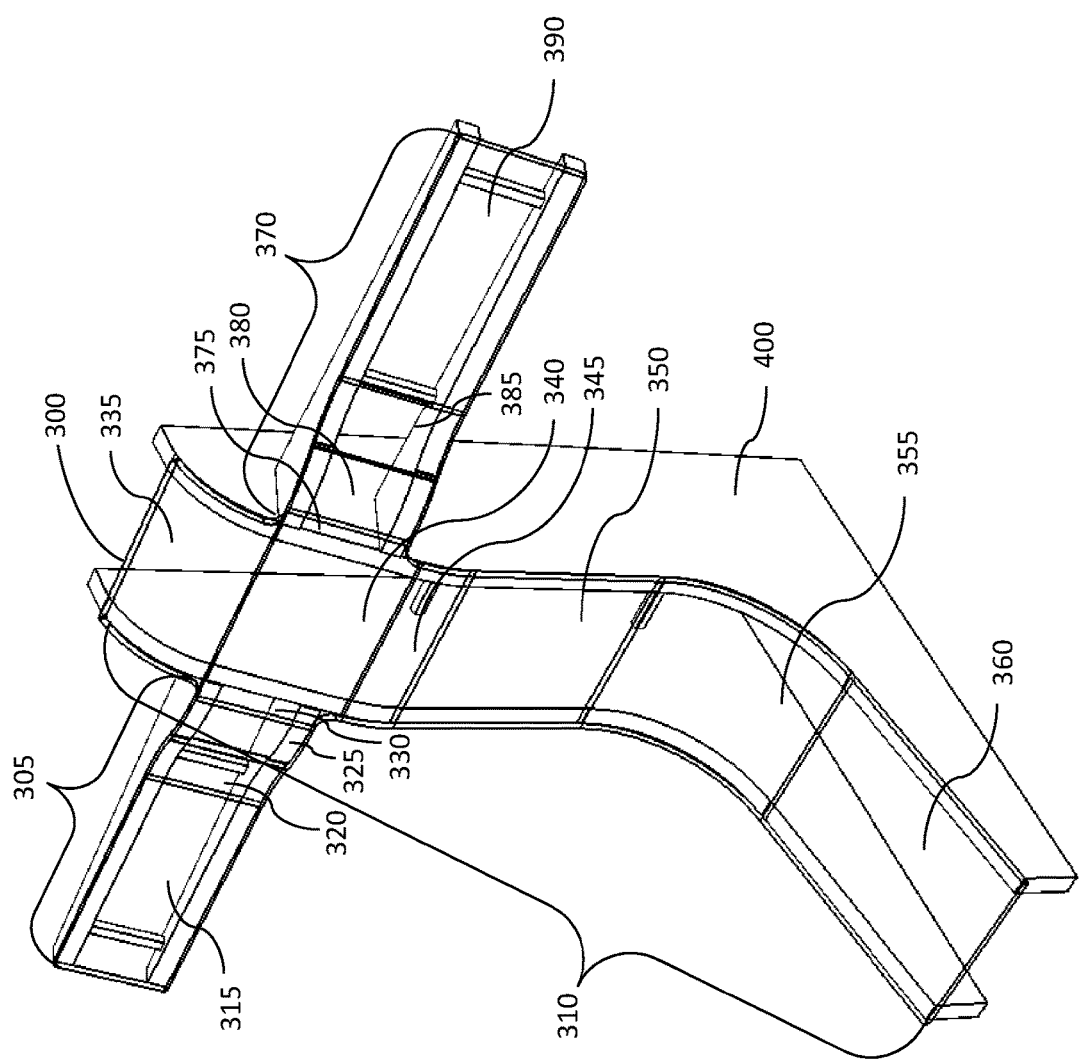
FIG. 2A is a perspective view of another exemplary embodiment of a preform and glass article having multiple bend regions.
Figure 2B:
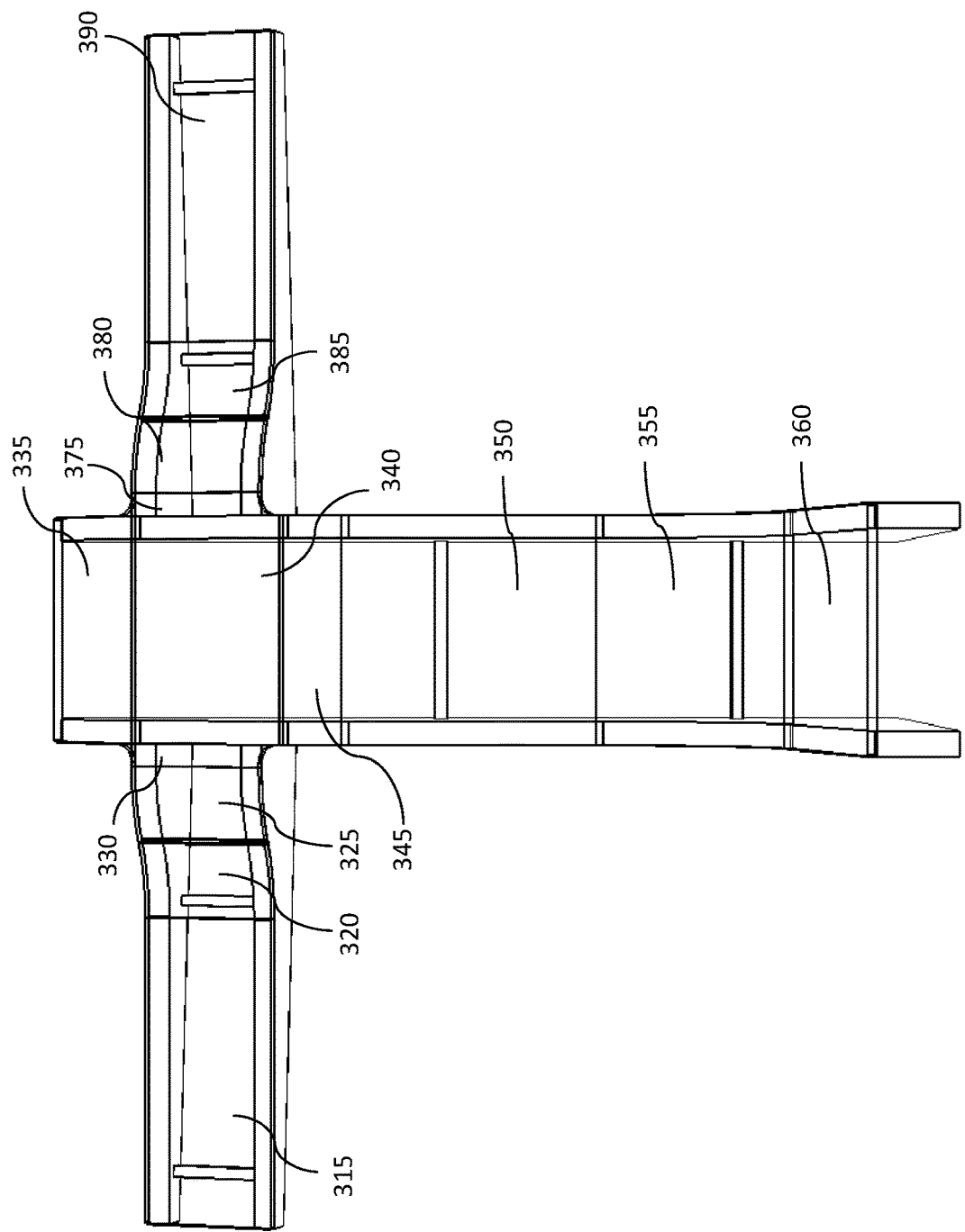
FIG. 2B is a front view of the preform and glass article having multiple bend regions shown in FIG. 2A.
Figure 2C:
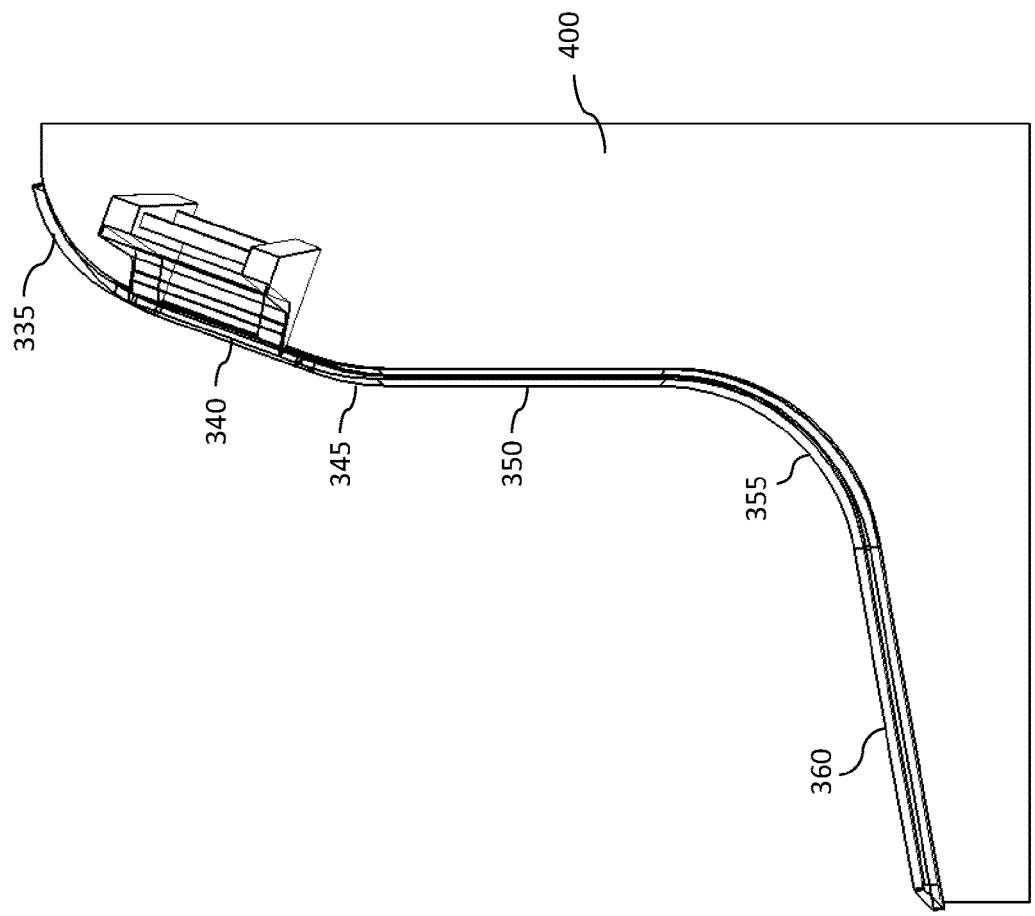
FIG. 2C is a side view of the preform and glass article having multiple bend regions shown in FIG. 2A.
Figure 2D:
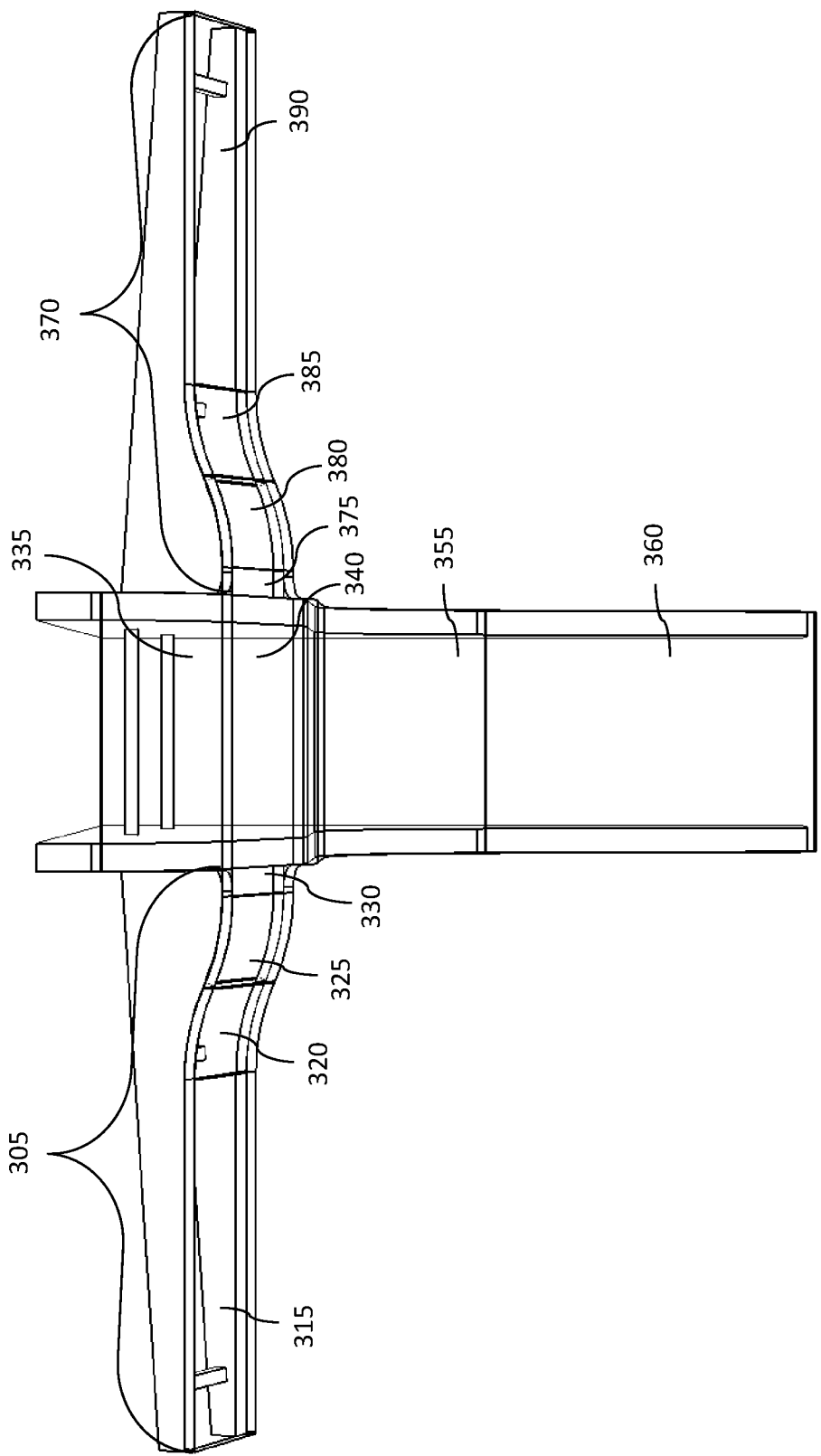
FIG. 2D is a top perspective view of the preform and glass article having multiple bend regions shown in FIG. 2A.

Before describing several exemplary embodiments of the disclosure, it is to be understood that the disclosure is not limited to the details of construction or process steps set forth in the following description. The descriptions in the disclosure are capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

It has been found that cold forming processes such as cold bending can be used to prepare complexly curved glass articles by use of a preform configuration in which one bend in a first direction is independent of a second bend in a second direction. Each of the cold bends can be either single curvature or double curvature. In one or more embodiments, the cold bend is a single curvature bend and does not have any cross curvature.

As used herein, "cold forming" refers to a process in which glass is shaped to have a curved or three-dimensional shape at a temperature below the glass transition temperature of the glass. Thus, according to one or more embodiments, in a cold forming process, the temperature is at least 200° C. below the glass transition temperature of the glass. In this disclosure, a glass article refers to a glass sheet that has been shaped to have multiple bend regions, as will be described herein. In one or more embodiments, a glass article includes a glass sheet that is subjected to cold forming or that is cold-formed. A cold formed glass sheet includes a first major surface comprising a first compressive stress and an opposing second major surface comprising a second compressive stress, wherein the first major surface is greater than the second compressive stress.

As used herein, "single curvature" bending is bending in at least a partial cylindrical-type shape that has a single radius of curvature. The axis running through the center of the cylindrical-type bend and perpendicular to the radius of curvature is designated herein as the "bend axis." Line segments that are located on the surface of the bend region of the article and that run parallel to the bend axis are designated herein as "bend line segments." As bend line segments are parallel to the associated bend axis, bend regions that have parallel or non-parallel bend axes will have parallel or non-parallel bend line segments, respectively.

As used herein, "double curvature" or "cross curvature" bending results from two interacting single curvatures that have overlapping bend axes, with each single curvature having its own bend axis and radius of curvature. Such configurations include synclastic and anticlastic configurations. In a synclastic configuration, all normal sections of the bend region are concave shaped or convex shaped, such as for a shell- or dome-shaped configuration. In an anticlastic configuration, some normal sections of the bend region will have a convex shape whereas others will have a concave shape, such as for a saddle-shaped configuration. The bend line segments for an article having double curvature will be curved due to the interaction of the two curvatures. Accordingly, the bend line segments for the two interacting curvatures in a double curvature are dependent and not independent.

As used herein, a "bend region" refers to a portion of an article that is curved in one or more directions. The bend region has non-zero curvature throughout the entire region. Bend regions can have single curvature or double curvature. In one or more embodiments, the bend region has single curvature and does not have any cross curvature. A bend region may be adjacent to another bend region or may be adjacent to a flat region.

As used herein, a "flat region" refers to a portion of an article that has substantially zero or zero curvature. As used herein, "substantially zero curvature" means a radius of curvature greater than about 1 m. A flat region can be located between two or more bend regions. In one or more embodiments, the minimum distance between two non-adjacent bend regions is at least 10 millimeters, and thus the flat region spans a distance of at least 10 millimeters. Exemplary flat regions can span distances including the following values or ranges defined therefrom: 10, 15, 20, 25, 30, 35, 40, 45, 50, 55, 60, 65, 70, 75, 80, 85, 90, 95, 100, 110, 120, 130, 140, 150, 200, 250, 300, 350, 400, 450, 500, 550, 600, 650, 700, 750, 800, 850, 900 or 950 millimeters, or 1, 1.1, 1.2, 1.3, 1.4, 1.5, 1.6, 1.7, 1.8, 1.9, 2, 2.5, 3, 3.5, 4, 4.5 or 5 meters.

FIGS. 1A-G illustrate various views of an exemplary embodiment of a preform 200 and a glass article 100 having multiple bend regions. Glass article 100 includes first portion 105 and second portion 110. First portion 105 has a flat region 115, bend region 120, bend region 125, and flat region 130. Second portion 110 has a flat region 135, bend region 140 and flat region 145. Bend regions 120 and 125 have parallel bend axes (not shown), but these bend axes are not parallel to the bend axis of bend region 140. Similarly, the bend line segments (not shown) of bend regions 120 and 125 are parallel to each other, but the bend line segments of bend regions 120 and 125 are not parallel to the bend line segments of bend region 140. The bend line segments of bend regions 120 and 125 also are independent of and do not intersect with the bend line segments of bend region 140. Bend regions 120 and 125 form an "S" shape due to the curvature of these two regions being in opposite directions. Preform 200 also has bend regions and flat regions corresponding to the bend regions and flat regions of glass article 100. Clips (not shown) can be used to ensure that the glass article 100 bends to adopt the shape of the preform 200. Alternatively, a complementary preform (not shown) can be placed on top of the glass article 100 on the preform 200 to ensure that the glass article bends to adopt the shape of the preforms. Other techniques for cold forming of the glass article are discussed below.

FIGS. 2A-D illustrate various views of another exemplary embodiment of a preform 400 and glass article 300 having multiple bend regions. Glass article 300 includes first portion 305, second portion 310 and third portion 370. First portion 305 has a flat region 315, bend region 320, bend region 325, and flat region 330. Second portion 310 has a bend region 335, flat region 340, bend region 345, flat region 350, bend region 355 and flat region 360. Third portion 370 has a flat region 375, bend region 380, bend region 385, and flat region 390. Bend regions 320, 325, 380 and 385 have parallel bend axes (not shown) and bend regions 335, 345 and 355 have parallel bend axes, but the bend axes of bend regions 320, 325, 380 and 385 are not parallel to the bend axes of bend regions 335, 345 and 355. Similarly, the bend line segments (not shown) of bend regions 320, 325, 380 and 385 are parallel and the bend line segments of bend regions 335, 345 and 355 are parallel, but the bend line segments of bend regions 320, 325, 380 and 385 are not parallel to the bend line segments of bend regions 335, 345 and 355. The bend line segments of bend regions 320, 325, 380 and 385 also are independent of and do not intersect with the bend line segments of bend regions 335, 345 and 355. Bend regions 320 and 325 form an "S" shape in the first portion 305 due to the curvature of these two regions being in opposite directions. Similarly, bend regions 380 and 385 also form an "S" shape in the third portion 370. The second portion 310 also has an "S" shape because the curvature of bend region 355 is in an opposite direction from the curvature of bend regions 335 and 345, even though the bend regions are separated by flat regions 340 and 350. Preform 400 also has bend regions and flat regions corresponding to the bend regions and flat regions of glass article 300. Techniques for bending the glass article 300 to adopt the shape of preform 400 are discussed in further detail below.

Figure 3C:
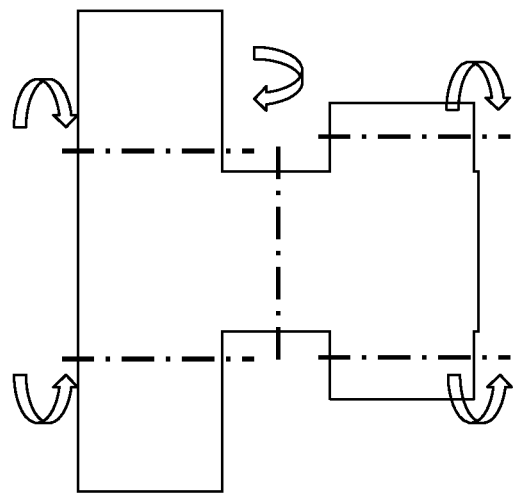
FIGS. 3A-F illustrate various exemplary embodiments of glass sheets before bending along different bend axes to provide multiple bend regions.
Figure 3B:
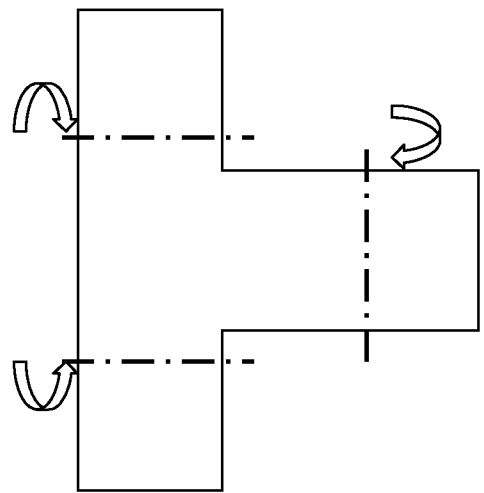
Figure 3A:
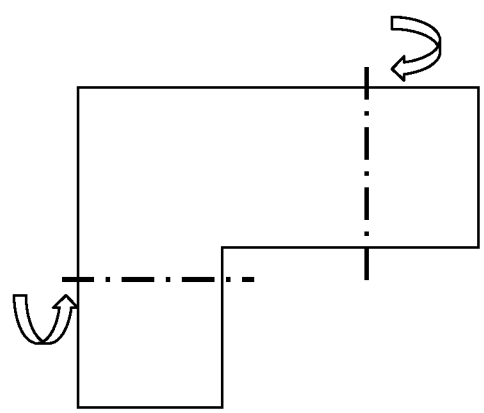
Figure 3F:
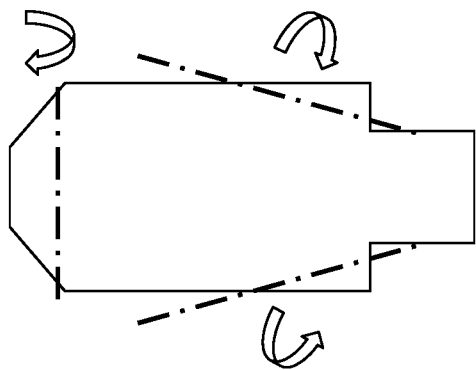
Figure 3E:
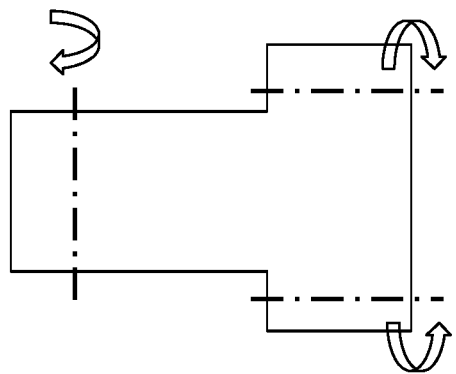
Figure 3D:
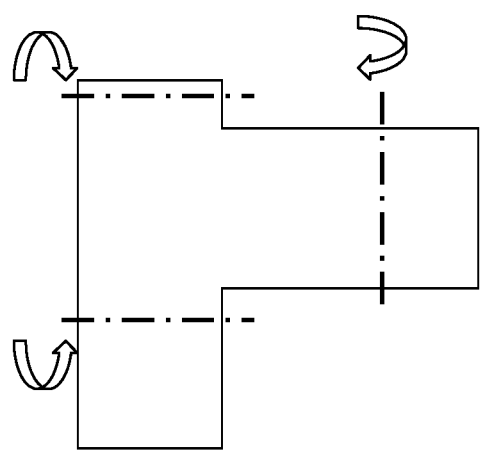

FIGS. 3A-F illustrate various exemplary embodiments of glass sheets before bending along different bend axes to provide multiple bend regions. In each of FIGS. 3A-F, dashed lines indicate bend axes and the arrows represent the direction of bend. As can be seen from FIG. 3A, the glass sheet can be bent around two non-parallel bend axes of a substrate having two portions providing an L-shaped sheet. As can be seen from FIG. 3B, the glass sheet can be bent around two parallel bend axes on a first portion and a third bend axis that is not parallel to the first two axes in a second portion of the substrate, the two portions providing a T-shaped substrate. As can be seen from FIG. 3C, the glass sheet can be bent around two parallel bend axes in one portion, and another bend axis in a second portion, and two parallel bend axes in a third portion, the first, second and third portions providing a substantially I-shaped substrate. In FIG. 3C, the bend axis in the second portion is not parallel to the bend axes in either the first portion or the second portion. As can be seen from FIG. 3D, the glass sheet can be bent around two parallel bend axes and a third bend axis that is not parallel to the first two axes on first and second portion of the substrate providing an asymmetrical T-shape. Also, FIG. 3D shows that the glass sheet does not have to be symmetric prior to bending. As can be seen from FIG. 3E, the glass sheet can be bent around two parallel bend axes in a first portion of the substrate and a third bend axis that is not parallel to the first two axes in a second portion of the substrate, the first and second portions providing a T-shaped substrate. As can be seen from FIG. 3F, the glass sheet can be bent around three non-parallel bend axes. It will be understood that the configurations shown in FIGS. 3A-3F are exemplary only and non-limiting, and the scope of the disclosure includes any substrate having two portions with multiple bend regions.

Accordingly, one aspect of the disclosure pertains to a glass article comprising a cold-formed, complexly-curved continuous glass sheet having a first bend in a first portion of the sheet defining a first bend region and having a set of first bend line segments, and a second bend in a second portion of the sheet defining a second bend region and having a set of second bend line segments, wherein the first bend line segments and the second bend line segments are independent, are not parallel, and do not intersect.

In one or more embodiments, the glass sheet may have a thickness of 7 millimeters or less, such as in the range of 25 micrometers and 5 millimeters. Exemplary thicknesses of the glass sheet include the following values or ranges defined therefrom: 25, 30, 35, 40, 45, 50, 55, 60, 65, 70, 75, 80, 85, 90, 95, 100, 110, 120, 130, 140, 150, 200, 250, 300, 350, 400, 450, 500, 550, 600, 650, 700, 750, 800, 850, 900 or 950 micrometers, or 1, 1.1, 1.2, 1.3, 1.4, 1.5, 1.6, 1.7, 1.8, 1.9, 2, 2.5, 3, 3.5, 4, 4.5 or 5 millimeters.

In one or more embodiments, the radius of curvature for one or more of the bends is greater than 20 millimeters, such as in the range of greater than 25 millimeters and less than 5 meters. Exemplary bend radii include the following values or ranges defined therefrom: 25, 30, 35, 40, 45, 50, 55, 60, 65, 70, 75, 80, 85, 90, 95, 100, 110, 120, 130, 140, 150, 200, 250, 300, 350, 400, 450, 500, 550, 600, 650, 700, 750, 800, 850, 900 or 950 millimeters, or 1, 1.1, 1.2, 1.3, 1.4, 1.5, 1.6, 1.7, 1.8, 1.9, 2, 2.5, 3, 3.5, 4, 4.5 or 5 meters. Each bend can have the same or different radius of curvature as another bend.

In one or more embodiments, the glass article has a first bend stress magnitude at the first bend region, a second bend stress magnitude at the second bend region, and a flat region stress magnitude, and the flat region stress magnitude differs from the first bend stress magnitude and the second bend stress magnitude by at least 1 MPa. Exemplary differentials for the stress magnitude between bend regions and flat regions include the following values or ranges defined therefrom: 1, 2, 3, 4, 5, 6, 7, 8, 9, 10, 11, 12, 13, 14, 15, 20, 25, 30, 40, 50, 60, 70, 80, 90 or 100 MPa. The difference in stress magnitudes between bend regions and flat regions can be the same or different for each bend.

In one or more embodiments, the glass article may include a glass sheet that is strengthened (prior to being shaped into the embodiments of the glass article described herein). For example, the glass sheet may be heat strengthened, tempered glass, chemically strengthened or strengthened by a combination thereof. In one or more embodiments, strengthened glass sheets have a compressive stress (CS) layer extending from a surface thereof to a compressive stress depth of layer (DOL). As used herein, "thermally strengthened" refers to articles that are heat treated to improve the strength of the article, and "thermally strengthened" includes tempered articles and heat-strengthened articles, for example tempered glass and heat-strengthened glass. Tempered glass involves an accelerated cooling process, which creates higher surface compression and/or edge compression in the glass. Factors that impact the degree of surface compression include the air-quench temperature, volume, and other variables that create a surface compression of at least 10,000 pounds per square inch (psi). Heat-strengthened glass is produced by a slower cooling than tempered glass, which results in a lower compression strength at the surface and heat-strengthened glass is approximately twice as strong as annealed, or untreated, glass.

In chemically strengthened glass sheets, the replacement of smaller ions by larger ions at a temperature below that at which the glass network can relax produces a distribution of ions across the surface of the glass that results in a stress profile. The larger volume of the incoming ion produces a CS extending from a surface and tension (central tension, or CT) in the center of the glass. T In strengthened glass sheets, the depth of the compressive stress is related to the central tension by the following approximate relationship (Equation 1)

$$CT \cong \frac{CS \times DOL}{thickness - 2 \times DOL}$$

where thickness is the total thickness of the strengthened glass sheet and compressive depth of layer (DOL) is the depth of the compressive stress. Unless otherwise specified, central tension CT and compressive stress CS are expressed herein in megaPascals (MPa), whereas thickness and depth of layer DOL are expressed in millimeters or microns.

In one or more embodiments, a strengthened glass sheet can have a surface CS of 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened glass sheet may have a compressive depth of layer 15 micrometers or greater, 20 micrometers or greater (e.g., 25, 30, 35, 40, 45, 50 micrometers or greater) and/or a central tension of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened glass sheet has one or more of the following: a surface compressive stress greater than 500 MPa, a depth of compressive layer greater than 15 micrometers, and a central tension greater than 18 MPa.

The strengthened glass sheets described herein may be chemically strengthened by an ion exchange process. In the ion-exchange process, typically by immersion of a glass sheet into a molten salt bath for a predetermined period of time, ions at or near the surface(s) of the glass sheet are exchanged for larger metal ions from the salt bath. In one embodiment, the temperature of the molten salt bath is from about 375° C. to about 450° C. and the predetermined time period is in the range from about four to about eight hours. In one example, sodium ions in a glass sheet are replaced by potassium ions from the molten bath, such as a potassium nitrate salt bath, though other alkali metal ions having larger atomic radii, such as rubidium or cesium, can replace smaller alkali metal ions in the glass. In another example, lithium ions in a glass sheet are replaced by potassium and/or sodium ions from the molten bath that may include potassium nitrate, sodium nitrate or a combination thereof, although other alkali metal ions having larger atomic radii, such as rubidium or cesium, can replace smaller alkali metal ions in the glass. According to particular embodiments, smaller alkali metal ions in the glass sheet can be replaced by Ag+ ions. Similarly, other alkali metal salts such as, but not limited to, sulfates, phosphates, halides, and the like may be used in the ion exchange process.

In chemically strengthened substrates, CS and DOL are determined by surface stress meter (FSM) using commercially available instruments such as the FSM-6000, manufactured by Luceo Co., Ltd. (Tokyo, Japan), or the like, and methods of measuring CS and depth of layer are described in ASTM 1422C-99, entitled "Standard Specification for Chemically Strengthened Flat Glass," and ASTM 1279 (1979) "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method.

The materials for the glass articles may be varied. The glass sheets used to form the glass articles can be amorphous articles or crystalline articles. Amorphous glass sheets according to one or more embodiments can be selected from soda lime glass, alkali aluminosilicate glass, alkali containing borosilicate glass and alkali aluminoborosilicate glass. Examples of crystalline glass sheets can include glass-ceramics, sapphire or spinel. Examples of glass-ceramics include $Li_2O$—$Al_2O_3$—$SiO_2$ system (i.e. LAS-System) glass ceramics, $MgO$—$Al_2O_3$—$SiO_2$ System (i.e. MAS-System) glass ceramics, glass ceramics including crystalline phases of any one or more of mullite, spinel, α-quartz, β-quartz solid solution, petalite, lithium dissilicate, β-spodumene, nepheline, and alumina.

Glass sheets may be provided using a variety of different processes. For example, exemplary glass sheet forming methods include float glass processes and down-draw processes such as fusion draw and slot draw. A glass sheet prepared by a float glass process may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass sheet that can be lifted from the tin onto rollers. Once off the bath, the glass sheet can be cooled further and annealed to reduce internal stress.

Down-draw processes produce glass sheet having a uniform thickness that possess relatively pristine surfaces. Because the average flexural strength of the glass sheet is controlled by the amount and size of surface flaws, a pristine surface that has had minimal contact has a higher initial strength. When this high strength glass sheet is then further strengthened (e.g., chemically), the resultant strength can be higher than that of a glass sheet with a surface that has been lapped and polished. Down-drawn glass sheet may be drawn to a thickness of less than about 2 millimeters. In addition, down drawn glass sheet have a very flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass sheet. The fusion draw method offers the advantage that, because the two glass films flowing over the channel fuse together, neither of the outside surfaces of the resulting glass sheet comes in contact with any part of the apparatus. Thus, the surface properties of the fusion drawn glass sheet are not affected by such contact.

The slot draw process is distinct from the fusion draw method. In slow draw processes, the molten raw material glass is provided to a drawing tank. The bottom of the drawing tank has an open slot with a nozzle that extends the length of the slot. The molten glass flows through the slot/nozzle and is drawn downward as a continuous sheet and into an annealing region.

Exemplary compositions for use in the glass sheets will now be described. One example glass composition comprises $SiO_2$, $B_2O_3$ and $Na_2O$, where $(SiO_2+B_2O_3) \geq 66$ mol. %, and $Na_2O \geq 9$ mol. %. Suitable glass compositions, in some embodiments, further comprise at least one of $K_2O$, MgO, and CaO. In a particular embodiment, the glass compositions can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass composition comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $((Al_2O_3+B_2O_3)/\Sigma modifiers) > 1$, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $((Al_2O_3+B_2O_3)/\Sigma modifiers) > 1$.

In still another embodiment, the glass article may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

In an alternative embodiment, the glass sheet may comprise an alkali aluminosilicate glass composition comprising: 2 mol % or more of $Al_2O_3$ and/or $ZrO_2$, or 4 mol % or more of $Al_2O_3$ and/or $ZrO_2$.

In some embodiments, the compositions used for a glass article may be batched with 0-2 mol. % of at least one fining agent selected from a group that includes $Na_2SO_4$, NaCl, NaF, NaBr, $K_2SO_4$, KCl, KF, KBr, and $SnO_2$.

The glass articles may be a single glass sheet or a laminate. According to one or more embodiments of the disclosure, a laminate refers to opposing glass substrates separated by an interlayer, for example, poly(vinyl butyral) (PVB). A glass sheet forming part of a laminate can be strengthened (chemically, thermally, and/or mechanically) as described above. Thus, laminates according to one or more embodiments comprise at least two glass sheets bonded together by an interlayer in which a first glass sheet defines an outer ply and a second glass sheet defines an inner ply. In vehicle applications such as automotive glazings, the inner ply is exposed to a vehicle or automobile interior and the outer ply faces an outside environment of the automobile. In vehicle applications such as automotive interiors, the inner ply is unexposed and placed on an underlying support (e.g., a display, dashboard, center console, instrument panel, seat back, seat front, floor board, door panel, pillar, arm rest etc.), and the outer ply is exposed to the vehicle or automobile interior. In architectural applications, the inner ply is exposed to a building, room, or furniture interior and the outer ply faces an outside environment of the building, room or furniture. In one or more embodiments, the glass sheets in a laminate are bonded together by an interlayer such as a polymer interlayer selected from the group consisting of polyvinyl butyral (PVB), ethylenevinylacetate (EVA), polyvinyl chloride (PVC), ionomers, and thermoplastic polyurethane (TPU).

Another aspect of the disclosure pertains to methods of cold forming the complexly curved glass articles described herein. In various embodiments, the cold forming involves bending a continuous glass sheet about a preform with a first bend region having a set of first bend line segments, and a second bend region having a set of second bend line segments, wherein the first bend line segments and the second bend line segments are independent, are not parallel, and do not intersect.

Non-limiting exemplary techniques for cold forming the complexly curved glass article include:

Placing the glass sheet in between two complementary preforms, with an adhesive between the glass sheet and one of the two preforms. For example, either of the preforms shown in FIGS. 1A-1G and 2A-2D could include a complementary preform, and a glass sheet can be cold formed between the preforms by applying force to move the two preforms toward each other. This force can be provided using mechanical force such as a worm gear, hydraulic force, pneumatic force or other suitable ways of providing appropriate force so that the glass sheet takes the form of the mold. The sandwich structure is pressed together to have the glass sheet take the shape of mold formed by the two preforms.

Attaching a thin frame made out of metal (such as aluminum, steel, etc.) on the periphery of the glass sheet. Bending or twisting equipment is used to provide shape to the frame, which in turn bends the glass. The shaped glass and its metal frame can be used as a single article in the same way as a glass article as described herein.

Sliding the glass sheet into a frame with grooves so that the glass will slide in to take the desired shape.

Using rollers, guide pins, or vacuum to conform the glass sheet to the shape of the preform.

Snapping the glass sheet into clips located on the preform.

In one or more embodiments, the cold forming is performed at a temperature below the glass transition temperature. Exemplary temperatures include room temperature (e.g. about 21° C.) or slightly elevated temperatures such as temperatures less than 200° C. In one or more embodiments, the temperature during cold forming is less than or equal to any of the following temperatures: 300, 250, 200, 150, 140, 130, 120, 110, 100, 90, 80, 70, 60, 50, 55, 50, 45, 40, 35, 30, 25 or 20° C. In one or more embodiments, the cold forming is performed at a certain temperature relative to the glass transition temperature of the glass, such as at least 10, 20, 30, 40, 50, 60, 70, 80, 90, 100, 150, 200, 250, 300, 350, 400, 450, 500, 600, 700, 800, 900 or 1,000° C. below the glass transition temperature.

In one or more embodiments, at least one bend is formed according to a cold forming process, and at least one bend is formed according to another process such as a hot form process. In alternate embodiments, all bends are formed according to cold forming processes.

In one or more embodiments, two or more bends are both formed according to cold forming processes, but the bends are introduced in sequential cold forming processes rather than simultaneously forming both bends. In other embodiments, all bends are formed simultaneously during the same cold forming process.

According to another aspect of the disclosure, a vehicle interior component includes a complexly curved glass article as described herein. Exemplary vehicles include: motor vehicles such as motorcycles, automobiles, trucks, buses; railed vehicles such as trains and trams; watercraft such as ships and boats; aircraft such as airplanes and helicopters; and spacecraft. In one or more embodiments, the vehicle is an automobile. The vehicle interior component can also comprise the glass article on a support surface. Exemplary vehicle interior components include a display, a center console, a dashboard, a door panel, a pillar, a floor board, an arm rest and an instrument cluster cover. The support surface can include, but is not limited to, fabric, leather, polymer, wood, metal and combinations thereof. The glass article can have one or more coatings such as an anti-glare coating, an anti-reflective coating, an oleophobic coating, an anti-scratch coating or an ink coating. The glass article can have different coatings on opposite surfaces, such as an ink coating on a first surface and an anti-reflective coating on a second surface.

According to one or more embodiments of the disclosure, a glass instrument cluster cover comprises a complexly curved glass article as described herein. According to one or more embodiments, a vehicle's instrument cluster houses various displays and indicators that enable an operator to operate the vehicle. Among these are several gauges, non-limiting examples including a speedometer, odometer, tachometer, oil pressure gauge, fuel gauge, etc. In addition, the vehicle's instrument cluster may include indicators for system malfunctions and warnings. Instrument clusters provide vehicle operators with a centralized and easily viewable location for displaying all critical system information. As used herein, "instrument cluster cover" includes a cover that covers the dashboard instrument cluster and/or the center console, which may include other components such as a radio, GPS, heater controls, etc.

Another aspect of the present disclosure pertains to a vehicle comprising a cabin and an interior, the interior comprising a vehicle interior component including a complexly curved glass article as described herein.

Figure 4B:
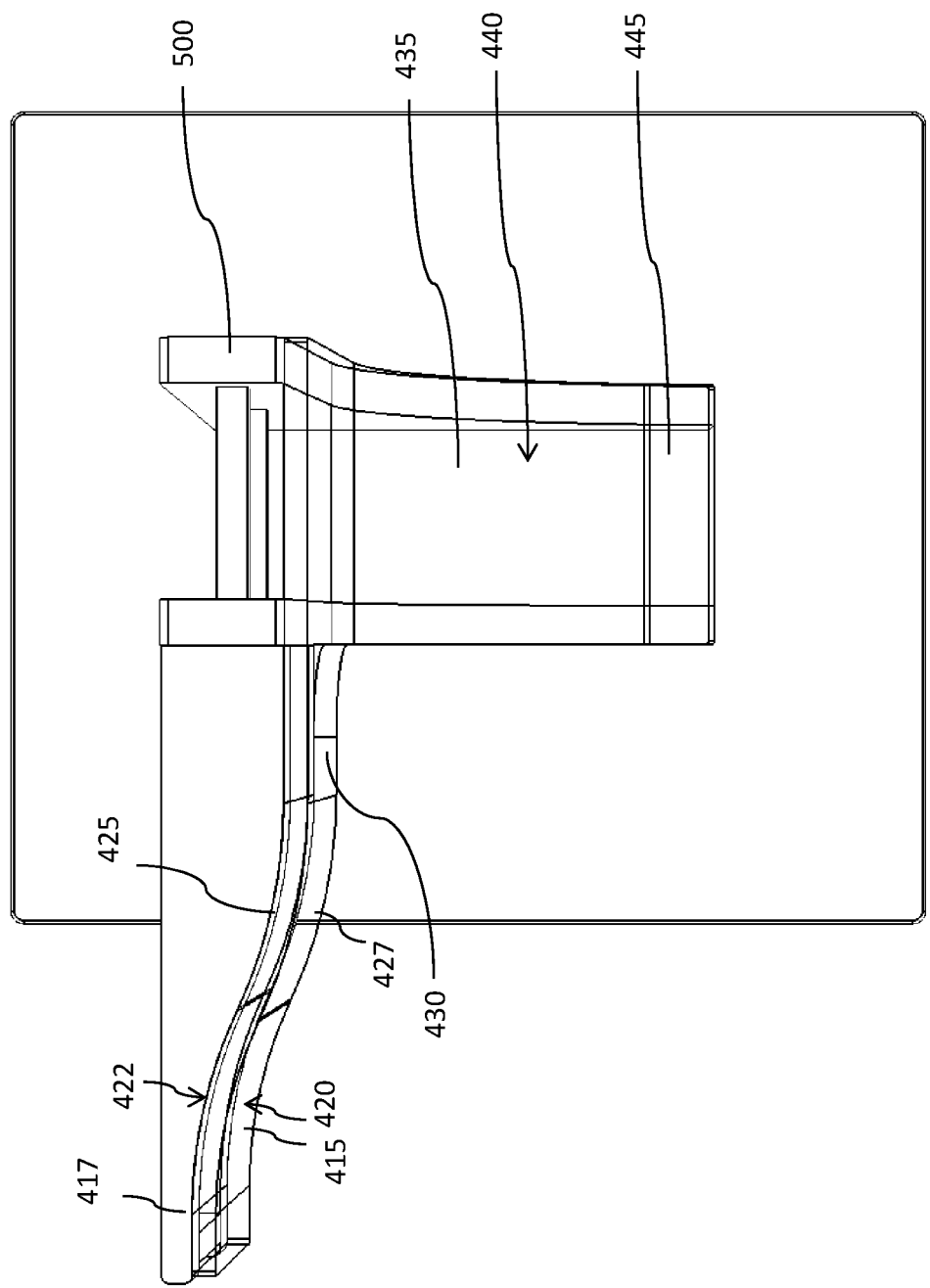
FIG. 4B illustrates a top view of the vehicle interior system of FIG. 4A.

Referring to FIGS. 4A-4C, another aspect of this disclosure pertains to a vehicle interior system comprising a base 500 having a base surface 502 (as shown in FIG. 4C), and a glass article 400 coupled to the base surface 502, wherein the glass article is at least partially elastically deformed. The term "elastically deformed" means the glass article is curved at a temperature less than the softening point of the glass article or below the strain point of the glass article. In one or more embodiments, exemplary temperatures for curving include room temperature (e.g. about 21° C.) or slightly elevated temperatures such as temperatures less than 200° C. In one or more embodiments, the temperature during curving is less than or equal to any of the following temperatures: 300° C., 250° C., 200° C., 150° C., 140° C., 130° C., 120° C., 110° C., 100° C., 90° C., 80° C., 70° C., 60° C., 50° C., 55° C., 50° C., 45° C., 40° C., 35° C., 30° C., 25° C. or 20° C. In one or more embodiments, temperature at which the glass article is curved is performed at a certain temperature relative the softening point or the strain point of glass article. For example, the glass article is curved at a temperature that is at least 10° C., 20° C., 30° C., 40° C., 50° C., 60° C., 70° C., 80° C., 90° C., 100° C., 150° C., 200° C., 250° C., 300° C., 350° C., 400° C., 450° C., or 500° C. less than the softening point or the strain point of the glass article. In one or more embodiments, the glass article 400 includes a glass sheet, as described herein according to one or more embodiments. According to one or more embodiments, the glass article 400 comprises a first portion 405 comprising a first elastically deformed surface 415 forming a first concave shape 420 with a first radius of curvature and a second elastically deformed surface 417 forming a second convex surface 422 that is directly opposite the first elastically deformed surface, wherein the second elastically deformed surface has a surface compressive stress that is less than a compressive stress at the first elastically deformed surface 415. As used herein, unless otherwise specified, the radius of curvature is an absolute value. In one or more embodiments, the difference between the magnitude of the surface compressive stress at the first elastically deformed surface 415 and the magnitude of the surface compressive stress at the second elastically deformed surface 417 differs by at least 1 MPa. Exemplary differentials for the stress magnitude between the first elastically deformed surface 415 and the second elastically deformed surface 417 is about 5 MPa or greater, about 10 MPa or greater, about 25 MPa or greater, about 50 MPa or greater, about 100 MPa or greater, about 150 MPa or greater, about 200 MPa or greater, about 250 MPa or greater, about 300 MPa or greater, or about 350 MPa or greater. In one or more embodiments, the second elastically deformed surface 417 has a surface compressive stress that is greater than about 20 MPa (e.g., about 50 MPa or greater, about 100 MPa or greater, about 150 MPa or greater, about 200 MPa or greater, about 250 MPa or greater, about 300 MPa or greater, about 350 MPa or greater, about 400 MPa or greater, about 450 MPa or greater, or about 500 MPa or greater). In one or more embodiments, the glass article includes a second portion 410, as shown in FIG. 4A. In one or more embodiments, the second portion 410 is directly adjacent or in contact with the first portion. In the embodiment shown in FIG. 4A, another portion (e.g., 430) separates the first portion 405 and the second portion 410. In one or more embodiments, the second portion 410 can be described as adjacent the first concave surface and first convex surface.

In one or more embodiments, the second portion is substantially planar portion (or substantially flat portion) (e.g., 430 in FIGS. 4A-4C). In one or more embodiments, the substantially planar portion has a radius of curvature that is greater than about 1000 mm (e.g., about 1500 mm or greater, about 1750 mm or greater, about 2000 mm or greater, about 2250 mm or greater, or about 2500 mm or greater).

In the embodiment shown in FIG. 4A, the second portion is curved. In one or more embodiments, the second portion may include a third elastically deformed surface 435 forming a third concave shape 440 with a third radius of curvature and a fourth elastically deformed surface 442 that is directly opposite the third elastically deformed surface that forms a fourth convex shape 444. In one or more embodiments (as shown in FIGS. 4A and 4B), the first radius of curvature and the third radius of curvature differ (e.g., the difference between the first radius of curvature and the third radius of curvature differ by about 10 mm or greater (e.g., about 20 mm or greater, about 30 mm or greater, about 50 mm or greater, about 100 mm or greater, about 250 mm or greater, or about 500 mm or greater). In one or more embodiments, the third elastically deformed surface (e.g., 425) opposes the first elastically deformed surface 415. In such embodiments, the third elastically deformed surface 425 is indirectly opposite the first elastically deformed surface 415 and forms an opposing curve with respect to the first concave shape 420. The fourth elastically deformed surface 427 is directly opposite the third elastically deformed surface.

In one or more embodiments, the third elastically deformed surface (425, 435) has a surface compressive stress that is greater than the surface compressive stress on the fourth elastically deformed surface (427, 442). For example, the difference between the magnitude of the surface compressive stress at the third elastically deformed surface and the magnitude of the surface compressive stress at the fourth elastically deformed surface differs by at least 1 MPa. Exemplary differentials for the stress magnitude between the third elastically deformed surface and the fourth elastically deformed surface is about 5 MPa or greater, about 10 MPa or greater, about 25 MPa or greater, about 50 MPa or greater, about 100 MPa or greater, about 150 MPa or greater, about 200 MPa or greater, about 250 MPa or greater, about 300 MPa or greater, or about 350 MPa or greater. In one or more embodiments, the third elastically deformed surface has a surface compressive stress that is greater than about 20 MPa (e.g., about 50 MPa or greater, about 100 MPa or greater, about 150 MPa or greater, about 200 MPa or greater, about 250 MPa or greater, about 300 MPa or greater, about 350 MPa or greater, about 400 MPa or greater, about 450 MPa or greater, or about 500 MPa or greater).

In one or more embodiments, the difference in stress magnitudes between the first and second elastically deformed surfaces and the difference in stress magnitudes between the third and fourth elastically deformed surfaces may be the same as one another or different from one another.

In one or more embodiments, the first radius of curvature is in a range from about 20 mm to about 2000 mm, from about 50 mm to about 2000 mm, from about 100 mm to about 2000 mm, from about 150 mm to about 2000 mm, from about 200 mm to about 2000 mm, from about 300 mm to about 2000 mm, from about 400 mm to about 2000 mm, from about 500 mm to about 2000 mm, from about 600 mm to about 2000 mm, from about 700 mm to about 2000 mm, from about 800 mm to about 2000 mm, from about 900 mm to about 2000 mm, from about 1000 mm to about 2000 mm, from about 1500 mm to about 2000 mm, from about 20 mm to about 1900 mm, from about 20 mm to about 1800 mm, from about 20 mm to about 1600 mm, from about 20 mm to about 1500 mm, from about 20 mm to about 1400 mm, from about 20 mm to about 1300 mm, from about 20 mm to about 1200 mm, from about 20 mm to about 1100 mm, from about 20 mm to about 1000 mm, from about 20 mm to about 900 mm, from about 20 mm to about 800 mm, from about 20 mm to about 700 mm, from about 20 mm to about 600 mm, from about 20 mm to about 500 mm, from about 750 mm to about 1750 mm, from about 1000 mm to about 1500 mm, from about 1250 mm to about 1750 mm, or from about 1400 mm to about 1600 mm.

In one or more embodiments, the third radius of curvature is in a range from about 20 mm to about 2000 mm, from about 50 mm to about 2000 mm, from about 100 mm to about 2000 mm, from about 150 mm to about 2000 mm, from about 200 mm to about 2000 mm, from about 300 mm to about 2000 mm, from about 400 mm to about 2000 mm, from about 500 mm to about 2000 mm, from about 600 mm to about 2000 mm, from about 700 mm to about 2000 mm, from about 800 mm to about 2000 mm, from about 900 mm to about 2000 mm, from about 1000 mm to about 2000 mm, from about 1500 mm to about 2000 mm, from about 20 mm to about 1900 mm, from about 20 mm to about 1800 mm, from about 20 mm to about 1600 mm, from about 20 mm to about 1500 mm, from about 20 mm to about 1400 mm, from about 20 mm to about 1300 mm, from about 20 mm to about 1200 mm, from about 20 mm to about 1100 mm, from about 20 mm to about 1000 mm, from about 20 mm to about 900 mm, from about 20 mm to about 800 mm, from about 20 mm to about 700 mm, from about 20 mm to about 600 mm, from about 20 mm to about 500 mm, from about 100 mm to about 750 mm, from about 150 mm to about 300 mm, or from about 100 mm to about 300 mm.

The glass article described herein may have a maximum thickness along the entirety of its area of about 2 mm or less, about 1.8 mm or less, about 1.6 mm or less, about 1.5 mm or less, about 1.4 mm or less, about 1.2 mm or less, about 1.1 mm or less, about 1 mm or less, about 0.8 mm or less, about 0.6 mm or less, about 0.5 mm or less, or about 0.4 mm or less.

In one or more embodiments, the first portion comprises a first thickness and the second portion comprises a second thickness that differs from the first thickness. In some embodiments, the first thickness is less than the second thickness. In some embodiments, the first thickness is less than the second thickness.

The first thickness may be in a range from about 0.1 mm to about 1.5 mm, from about 0.2 mm to about 1.5 mm, from about 0.3 mm to about 1.5 mm, from about 0.4 mm to about 1.5 mm, from about 0.5 mm to about 1.5 mm, from about 0.55 mm to about 1.5 mm, from about 0.6 mm to about 1.5 mm, from about 0.7 mm to about 1.5 mm, from about 0.8 mm to about 1.5 mm, from about 0.9 mm to about 1.5 mm, from about 1 mm to about 1.5 mm, from about 1.1 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1 mm, from about 0.1 mm to about 0.9 mm, from about 0.1 mm to about 0.8 mm, from about 0.1 mm to about 0.7 mm, from about 0.1 mm to about 0.6 mm, from about 0.1 mm to about 0.55 mm, from about 0.1 mm to about 0.5 mm, from about 0.1 mm to about 0.4 mm, from about 0.1 mm to about 0.3 mm, from about 0.3 mm to about 0.7 mm, or from about 0.3 mm to about 0.55 mm.

The second thickness may be in a range from about 0.1 mm to about 1.5 mm, from about 0.2 mm to about 1.5 mm, from about 0.3 mm to about 1.5 mm, from about 0.4 mm to about 1.5 mm, from about 0.5 mm to about 1.5 mm, from about 0.55 mm to about 1.5 mm, from about 0.6 mm to about 1.5 mm, from about 0.7 mm to about 1.5 mm, from about 0.8 mm to about 1.5 mm, from about 0.9 mm to about 1.5 mm, from about 1 mm to about 1.5 mm, from about 1.1 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1 mm, from about 0.1 mm to about 0.9 mm, from about 0.1 mm to about 0.8 mm, from about 0.1 mm to about 0.7 mm, from about 0.1 mm to about 0.6 mm, from about 0.1 mm to about 0.55 mm, from about 0.1 mm to about 0.5 mm, from about 0.1 mm to about 0.4 mm, from about 0.1 mm to about 0.3 mm, from about 0.3 mm to about 0.7 mm, or from about 0.3 mm to about 0.55 mm.

In one or more embodiments, the vehicle interior system includes an adhesive disposed between the base surface and the glass article. In one or more embodiments, the adhesive may have a thickness of about 1 mm or less. In some embodiments, the adhesive has a thickness in a range from about 200 µm to about 500 µm, from about 225 µm to about 500 µm, from about 250 µm to about 500 µm, from about 275 µm to about 500 µm, from about 300 µm to about 500 µm, from about 325 µm to about 500 µm, from about 350 µm to about 500 µm, from about 375 µm to about 500 µm, from about 400 µm to about 500 µm, from about 200 µm to about 475 µm, from about 200 µm to about 450 µm, from about 200 µm to about 425 µm, from about 200 µm to about 400 µm, from about 200 µm to about 375 µm, from about 200 µm to about 350 µm, from about 200 µm to about 325 µm, from about 200 µm to about 300 µm, or from about 225 µm to about 275 µm. The adhesive may include a structural adhesive.

In particular embodiments, exemplary structural adhesives include an adhesive selected from one of more of the categories: (a) Toughened Epoxy (Masterbond EP21TDCHT-LO, 3M Scotch Weld Epoxy DP460 Off-white); (b) Flexible Epoxy (Masterbond EP21TDC-2LO, 3M Scotch Weld Epoxy 2216 B/A Gray); (c) Acrylic (LORD Adhesive 410/Accelerator 19 w/LORD AP 134 primer, LORD Adhesive 852/LORD Accelerator 25 GB, Loctite HF8000, Loctite AA4800); (d) Urethanes (3M Scotch Weld Urethane DP640 Brown); and (e) Silicones (Dow Corning 995). In some cases, structural glues available in sheet format (such as B-staged epoxy adhesives) may be utilized. Furthermore, pressure sensitive structural adhesives such as 3M VHB tapes may be utilized. In such embodiments, utilizing a pressure sensitive adhesive allows for the curved glass article to be bonded without the need for a curing step. In one or more embodiments, the adhesive is a UV-curable adhesive. In one or more embodiments, the adhesive may be an optically clear adhesive, such as a liquid optically clear adhesive, such as a liquid optically clear adhesive (LOCA) available from E3 Display.

In one or more embodiments, the vehicle interior system includes a display or touch panel 600 disposed between the base and the glass article, as shown in FIG. 4A. In one or more embodiments, the display has a display surface 602 having a display radius of curvature. In one or more embodiments, the touch panel has a touch panel surface (not shown) having a touch panel radius of curvature. In one or more embodiments, the display or touch panel may be coupled to either one or more of the first elastically deformed surface, the second elastically deformed surface, the third elastically deformed surface or the fourth elastically deformed surface. In one or more embodiments, the display or touch panel is coupled to either one of or both the first elastically deformed surface and the third elastically deformed surface. In one or more embodiments, the display or touch panel radius of curvature is within 10% of either one or both the first and third radius of curvature. For example, the display or touch panel radius of curvature may be about 500 mm and the first and/or third radius of curvature may be from about 450 mm to about 550 mm. The display or touch panel radius of curvature may be within 8%, 6%, 5%, 4% or 2% of either one or both the first and third radius of curvature. In one or more embodiments, the substantially planar portion 430 is coupled to the display or touch panel.

The display may be a liquid crystal display or an organic light emitting diode display. In one or more embodiments, the vehicle interior system includes an air gap between the display or touch panel surface and the glass article (i.e., a portion of the glass article is adjacent but not in direct contact with the display surface or touch panel surface).

In one or more embodiments, the base comprises any one of a dashboard, a center console, a door panel, a headrest, an armrest, a seat back, a floor board, a pillar, or the steering wheel. In some embodiments, the base surface comprises a convex shape having a base radius of curvature. In some embodiments, the base surface may be coupled to either one or more of the first elastically deformed surface, the second elastically deformed surface, the third elastically deformed surface or the fourth elastically deformed surface. In one or more embodiments, the base surface is coupled to either one of or both the first elastically deformed surface and the third elastically deformed surface. In some embodiments, the base radius of curvature is within 10% of either one or both the first and third radius of curvature. The base radius of curvature may be within 8%, 6%, 5%, 4% or 2% of either one or both the first and third radius of curvature. In one or more embodiments, the glass article comprises at least one opening. The opening may permit direct access to the base surface (e.g., to access knobs, buttons or other components).

In one or more embodiments, the glass article includes a coating or surface treatment disposed on either one or more of the first elastically deformed surface, second elastically deformed surface, third elastically deformed surface, and fourth elastically deformed surface. For example, the coating or surface treatment may be disposed on either one or both of the first elastically deformed surface and the second elastically deformed surface.

The coating or surface treatment may cover at least a portion of the surface on which it is disposed. Exemplary surface treatments include an easy-to-clean surface, an anti-glare surface, an anti-reflective surface, and a decorative surface. The decorative surface may include an ink, paint or other pigment to provide an aesthetic design (e.g., a wood-grain design, a brushed metal design, a graphic design, a portrait, or a logo). The decorative surface may be formed by printing. In one or more embodiments, the anti-glare surface includes an etched surface. In one or more embodiments, the anti-reflective surface includes a multi-layer coating. In one or more embodiments, the easy-to-clean surface includes an oleophobic coating that imparts anti-fingerprint properties.

In one or more embodiments, the glass article is strengthened as otherwise described herein. For example the glass article may be chemically strengthened, thermally strengthened, or mechanically strengthened. In some embodiments, the glass article chemically strengthened and mechanically strengthened, chemically strengthened and thermally strengthened or mechanically strengthened and thermally strengthened.

Another aspect of this disclosure pertains to a vehicle interior system comprising: a base having a curved surface, and a glass article comprising a cold-formed and complexly curved continuous glass sheet disposed on the curved surface. In one or more embodiments, the glass sheet comprises a glass surface wherein all points of the glass surface have a Gaussian curvature (GC) that is equal to zero (GC=Kmax*Kmin, wherein Kmax and Kmin are principal curvatures defined as Kmax=1/R' and Kmin=1/R"), and wherein one of Kmax and Kmin is non-zero. The glass surface may form a portion of the total surface area of the glass sheet or an entire major surface of the glass sheet. The glass substrate is complexly curved in that it includes two separate bend regions, wherein a first bend region in a first portion has a set of first bend line segments, and a second bend in a second portion has a set of second bend line segments, wherein the first bend line segments and the second bend line segments are independent, are not parallel, and do not intersect.

In one or more embodiments, the glass sheet has a thickness of about 2 mm or less (e.g., about 1.8 mm or less, about 1.6 mm or less, about 1.5 mm or less, about 1.4 mm or less, about 1.2 mm or less, about 1.1 mm or less, about 1 mm or less, about 0.8 mm or less, about 0.6 mm or less, about 0.5 mm or less, or about 0.4 mm or less).

In one or more embodiments, a portion of the glass surface comprises a concave shape and the radius of curvature (R') of the concave shape is in a range from about 37.5 mm to about 500 mm (e.g., from about 37.5 mm to about 500 mm, from about 40 mm to about 500 mm, from about 50 mm to about 500 mm, from about 75 mm to about 500 mm, from about 100 mm to about 500 mm, from about 125 mm to about 500 mm, from about 150 mm to about 500 mm, from about 175 mm to about 500 mm, from about 200 mm to about 500 mm, from about 225 mm to about 500 mm, from about 250 mm to about 500 mm, from about 37.5 mm to about 400 mm, from about 37.5 mm to about 300 mm, from about 37.5 mm to about 250 mm, from about 37.5 mm to about 200 mm, from about 37.5 mm to about 150 mm, or from about 37.5 mm to about 100 mm). In one or more embodiments, a portion of the glass article comprises a concave shape and R' of the concave shape is in a range from about 15 mm to about 300 mm. In some embodiments with a concave shape, the thickness of the glass article may be 0.4 mm and the R' may be in a range from about 15 mm to about 100 mm, from about 30 mm to about 100 mm, from about 50 mm to about 100 mm, form about 75 mm to about 100 mm, from about 15 mm to about 75 mm, from about 15 mm to about 50 mm, or from about 15 mm to about 30 mm. In some embodiments with a concave shape, the thickness of the glass article may be 0.55 mm and the R' may be in a range from about 20 mm to about 150 mm, from about 40 mm to about 150 mm, from about 50 mm to about 150 mm, form about 75 mm to about 150 mm, from about 20 mm to about 125 mm, from about 20 mm to about 100 mm, or from about 20 mm to about 75 mm. In some embodiments with a concave surface, the thickness of the substrate may be 0.7 mm and the R' may be in a range from about 25 mm to about 175 mm, from about 50 mm to about 175 mm, from about 75 mm to about 175 mm, form about 100 mm to about 175 mm, from about 150 mm to about 175 mm, from about 25 mm to about 150 mm, from about 25 mm to about 125 mm, from about 25 mm to about 100 mm or from about 25 mm to about 75 mm. In some embodiments with a concave shape, the thickness of the glass article may be 1.1 mm and the R' may be in a range from about 40 mm to about 225 mm, from about 50 mm to about 225 mm, from about 75 mm to about 225 mm, form about 100 mm to about 225 mm, from about 150 mm to about 225 mm, from about 40 mm to about 200 mm, from about 40 mm to about 175 mm, from about 40 mm to about 150 mm or from about 40 mm to about 100 mm. In some embodiments with a concave shape, the thickness of the glass article may be 1.3 mm and the R' may be in a range from about 150 mm to about 250 mm, from about 175 mm to about 250 mm, from about 200 mm to about 250 mm, form about 225 mm to about 250 mm, from about 150 mm to about 225 mm, from about 150 mm to about 200 mm, or from about 150 mm to about 175 mm.

In one or more embodiments, a portion of the glass surface comprises a convex shape and radius of curvature (R') of the convex shape is in a range from about 20 mm to about 500 mm (e.g., from about 40 mm to about 500 mm, from about 50 mm to about 500 mm, from about 75 mm to about 500 mm, from about 100 mm to about 500 mm, from about 120 mm to about 500 mm, from about 140 mm to about 500 mm, from about 150 mm to about 500 mm, from about 160 mm to about 500 mm, from about 180 mm to about 500 mm, from about 200 mm to about 500 mm, from about 250 mm to about 500 mm, from about 300 mm to about 500 mm, from about 20 mm to about 400 mm, from about 20 mm to about 300 mm, from about 20 mm to about 250 mm, from about 20 mm to about 200 mm, from about 20 mm to about 150 mm, or from about 20 mm to about 100 mm). In some embodiments, a portion of the glass article may have a convex shape, a thickness of about 0.4 mm, and an R' in a range from about 100 mm to about 200 mm, from about 125 mm to about 200 mm, from about 150 mm to about 200 mm, form about 175 mm to about 200 mm, from about 100 mm to about 175 mm, from about 100 mm to about 150 mm, or from about 100 mm to about 125 mm. In some embodiments with a convex shape, the thickness of the glass article may be about 0.55 mm and the R' may be in a range from about 150 mm to about 250 mm, from about 175 mm to about 250 mm, from about 200 mm to about 250 mm, form about 225 mm to about 250 mm, from about 150 mm to about 225 mm, from about 150 mm to about 200 mm, or from about 150 mm to about 175 mm. In some embodiments with a convex shape, the thickness of the glass article may be 0.7 mm and the R' may be in a range from about 200 mm to about 300 mm, from about 225 mm to about 300 mm, from about 250 mm to about 300 mm, form about 275 mm to about 300 mm, from about 200 mm to about 275 mm, from about 200 mm to about 250 mm, or from about 200 mm to about 225 mm. In some embodiments with a convex shape, the thickness of the glass article may be 1.1 mm and the R' may be in a range from about 350 mm to about 450 mm, from about 375 mm to about 450 mm, from about 300 mm to about 450 mm, form about 325 mm to about 450 mm, from about 350 mm to about 425 mm, from about 350 mm to about 400 mm, or from about 350 mm to about 375 mm. In some embodiments with a convex shape, the thickness of the glass article may be 1.3 mm and the R' may be in a range from about 450 mm to about 550 mm, from about 475 mm to about 550 mm, from about 400 mm to about 550 mm, form about 425 mm to about 550 mm, from about 450 mm to about 525 mm, from about 450 mm to about 500 mm, or from about 450 mm to about 475 mm.

In one or more embodiments, the vehicle interior system includes a display or a touch panel. In one or more embodiments, the display or touch panel is disposed between the base and the glass article. In some embodiments, the display or touch panel is curved.

In some embodiments, the glass sheet is strengthened, as described herein.

The glass sheet of one or more embodiments includes a first major surface and a second major surface opposing the first major surface, wherein either one or both of the first major surface and the second major surface comprises a coating or surface treatment (as described herein). In one or more embodiments, the glass sheet further comprises an opening.

Another aspect of this disclosure pertains to a glass article for an automobile interior that includes a first portion having a first length with a first bend over at least a portion of the first length, the first bend having a first bend axis, a second portion extending in a direction generally perpendicular to the first portion, the second portion having a second length with a second bend over at least a portion of the second length, the second portion having a second bend axis, wherein the bend in the first portion and the bend in the second portion concavely curve in opposite directions and the first bend axis and the second bend axis are not parallel. In some embodiments, the bend in the first portion and the bend in the second portion are separated by a substantially planar portion. In some embodiments, the glass article has a T-shape, or an L-shape. In some instances, the glass article may optionally include a third bend axis that is parallel to one of the first and second bend axes.

In one or more embodiments, the glass article has a thickness of about 2 mm or less (e.g., about 1.8 mm or less, about 1.6 mm or less, about 1.5 mm or less, about 1.4 mm or less, about 1.2 mm or less, about 1.1 mm or less, about 1 mm or less, about 0.8 mm or less, about 0.6 mm or less, about 0.5 mm or less, or about 0.4 mm or less).

In one or more embodiments, a portion of the glass article comprises a concave shape and the radius of curvature (R') of the concave shape is in a range from about 37.5 mm to about 500 mm (e.g., from about 37.5 mm to about 500 mm, from about 40 mm to about 500 mm, from about 50 mm to about 500 mm, from about 75 mm to about 500 mm, from about 100 mm to about 500 mm, from about 125 mm to about 500 mm, from about 150 mm to about 500 mm, from about 175 mm to about 500 mm, from about 200 mm to about 500 mm, from about 225 mm to about 500 mm, from about 250 mm to about 500 mm, from about 37.5 mm to about 400 mm, from about 37.5 mm to about 300 mm, from about 37.5 mm to about 250 mm, from about 37.5 mm to about 200 mm, from about 37.5 mm to about 150 mm, or from about 37.5 mm to about 100 mm). In one or more embodiments, a portion of the glass article comprises a concave shape and R' of the concave shape is in a range from about 15 mm to about 300 mm. In some embodiments with a concave shape, the thickness of the glass article may be 0.4 mm and the R' may be in a range from about 15 mm to about 100 mm, from about 30 mm to about 100 mm, from about 50 mm to about 100 mm, form about 75 mm to about 100 mm, from about 15 mm to about 75 mm, from about 15 mm to about 50 mm, or from about 15 mm to about 30 mm. In some embodiments with a concave shape, the thickness of the glass article may be 0.55 mm and the R' may be in a range from about 20 mm to about 150 mm, from about 40 mm to about 150 mm, from about 50 mm to about 150 mm, form about 75 mm to about 150 mm, from about 20 mm to about 125 mm, from about 20 mm to about 100 mm, or from about 20 mm to about 75 mm. In some embodiments with a concave surface, the thickness of the substrate may be 0.7 mm and the R' may be in a range from about 25 mm to about 175 mm, from about 50 mm to about 175 mm, from about 75 mm to about 175 mm, form about 100 mm to about 175 mm, from about 150 mm to about 175 mm, from about 25 mm to about 150 mm, from about 25 mm to about 125 mm, from about 25 mm to about 100 mm or from about 25 mm to about 75 mm. In some embodiments with a concave shape, the thickness of the glass article may be 1.1 mm and the R' may be in a range from about 40 mm to about 225 mm, from about 50 mm to about 225 mm, from about 75 mm to about 225 mm, form about 100 mm to about 225 mm, from about 150 mm to about 225 mm, from about 40 mm to about 200 mm, from about 40 mm to about 175 mm, from about 40 mm to about 150 mm or from about 40 mm to about 100 mm. In some embodiments with a concave shape, the thickness of the glass article may be 1.3 mm and the R' may be in a range from about 150 mm to about 250 mm, from about 175 mm to about 250 mm, from about 200 mm to about 250 mm, form about 225 mm to about 250 mm, from about 150 mm to about 225 mm, from about 150 mm to about 200 mm, or from about 150 mm to about 175 mm.

In one or more embodiments, a portion of the glass article comprises a convex shape and radius of curvature (R') of the convex shape is in a range from about 20 mm to about 500 mm (e.g., from about 40 mm to about 500 mm, from about 50 mm to about 500 mm, from about 75 mm to about 500 mm, from about 100 mm to about 500 mm, from about 120 mm to about 500 mm, from about 140 mm to about 500 mm, from about 150 mm to about 500 mm, from about 160 mm to about 500 mm, from about 180 mm to about 500 mm, from about 200 mm to about 500 mm, from about 250 mm to about 500 mm, from about 300 mm to about 500 mm, from about 20 mm to about 400 mm, from about 20 mm to about 300 mm, from about 20 mm to about 250 mm, from about 20 mm to about 200 mm, from about 20 mm to about 150 mm, or from about 20 mm to about 100 mm). In some embodiments, a portion of the glass article may have a convex shape, a thickness of about 0.4 mm, and an R' in a range from about 100 mm to about 200 mm, from about 125 mm to about 200 mm, from about 150 mm to about 200 mm, form about 175 mm to about 200 mm, from about 100 mm to about 175 mm, from about 100 mm to about 150 mm, or from about 100 mm to about 125 mm. In some embodiments with a convex shape, the thickness of the glass article may be about 0.55 mm and the R' may be in a range from about 150 mm to about 250 mm, from about 175 mm to about 250 mm, from about 200 mm to about 250 mm, form about 225 mm to about 250 mm, from about 150 mm to about 225 mm, from about 150 mm to about 200 mm, or from about 150 mm to about 175 mm. In some embodiments with a convex shape, the thickness of the glass article may be 0.7 mm and the R' may be in a range from about 200 mm to about 300 mm, from about 225 mm to about 300 mm, from about 250 mm to about 300 mm, form about 275 mm to about 300 mm, from about 200 mm to about 275 mm, from about 200 mm to about 250 mm, or from about 200 mm to about 225 mm. In some embodiments with a convex shape, the thickness of the glass article may be 1.1 mm and the R' may be in a range from about 350 mm to about 450 mm, from about 375 mm to about 450 mm, from about 300 mm to about 450 mm, form about 325 mm to about 450 mm, from about 350 mm to about 425 mm, from about 350 mm to about 400 mm, or from about 350 mm to about 375 mm. In some embodiments with a convex shape, the thickness of the glass article may be 1.3 mm and the R' may be in a range from about 450 mm to about 550 mm, from about 475 mm to about 550 mm, from about 400 mm to about 550 mm, form about 425 mm to about 550 mm, from about 450 mm to about 525 mm, from about 450 mm to about 500 mm, or from about 450 mm to about 475 mm.

The glass article of one or more embodiments includes a first major surface and a second major surface opposing the first major surface. In one or more embodiments, either one or both of the first major surface and the second major surface comprises a coating or surface treatment (as described herein). In one or more embodiments, the glass article includes a display or a touch panel that is coupled to the first surface. In one or more embodiments, the glass article includes an air gap between the display and the first surface. In some embodiments, the display or touch panel is curved. In some embodiments, the glass sheet is strengthened, as described herein. In one or more embodiments, the glass article comprises an opening.

It will be understood that the disclosure further provides for at least the following embodiments:

A first embodiment pertaining to a glass article comprising a cold-formed, complexly-curved continuous glass sheet having a first bend in a first portion of the sheet defining a first bend region and having a set of first bend line segments, and a second bend in a second portion of the sheet defining a second bend region and having a set of second bend line segments, wherein the first bend line segments and the second bend line segments are independent, are not parallel, and do not intersect.

In a second embodiment, the first embodiment includes the feature of a first portion of the sheet includes the first bend region and a second portion of the sheet includes the second bend region.

In a third embodiment, the second embodiment includes the feature of the first portion has a plurality of bend regions having a plurality of first portion bend axes, wherein at least two of the first portion bend axes are parallel.

In a fourth embodiment, the third embodiment includes the feature of second portion has a plurality of bend regions having a plurality of second portion bend axes, wherein at least two of the first portion bend axes are parallel.

In a fifth embodiment, the fourth embodiment includes the feature of the first portion includes an S-curve.

In a sixth embodiment, the fifth embodiment includes the feature of the second portion includes an S-curve.

In a seventh embodiment, the sixth embodiment includes the feature of the first bend region and the second bend region are separated by a flat region that is not curved for a distance of at least 10 millimeters.

In an eighth embodiment, the first embodiment includes the feature of the glass article has a first bend stress magnitude at the first bend region, a second bend stress magnitude at the second bend region, and a flat region stress magnitude, and the flat region stress magnitude differs from the first bend stress magnitude and the second bend stress magnitude by at least 1 MPa.

In a ninth embodiment, the eighth embodiment includes the feature of the flat region stress magnitude differs from the first bend stress magnitude and the second bend stress magnitude by at least 10 MPa.

In a tenth embodiment, the first embodiment includes the feature of the sheet has a first surface and a second surface and a thickness defined by the first surface and second surface, and the thickness is in a range of 25 micrometers and 5 millimeters.

In an eleventh embodiment, the first embodiment includes the feature of at least one of the first bend and the second bend has a radius of curvature of greater than 25 millimeters and less than 5 meters.

In a twelfth embodiment, the eleventh embodiment includes the feature of both the first bend and the second bend have a radius of curvature of greater than 25 millimeters and less than 5 meters.

In a thirteenth embodiment, the first embodiment includes the feature of the sheet has a first surface and a second surface, wherein the first bend has a first bend compressive stress at the first surface that is greater than a first bend compressive stress at the second surface, and wherein the second bend has a second bend compressive stress at the first surface that is greater than a second bend compressive stress at the second surface.

In a fourteenth embodiment, the first through thirteenth embodiments include the feature of the glass article comprises a strengthened glass substrate selected from the group consisting of a laminated glass substrate, chemically strengthened glass substrate, a thermally strengthened glass substrate and a combination thereof.

In a fifteenth embodiment, the first through fourteenth embodiments include the feature of the sheet comprises an ion exchangeable alkali aluminosilicate glass composition.

In a sixteenth embodiment, the first through fourteenth embodiments include the feature of the sheet comprises an ion exchangeable alkali aluminoborosilicate glass composition.

In a seventeenth embodiment, the first through sixteenth embodiments include the feature of the sheet comprises a chemically strengthened glass substrate with ions exchanged in an outer region to a depth of layer (DOL) in a range of about 10 micrometers to about 90 micrometers from an outer surface of the glass substrate.

In an eighteenth embodiment, the seventeenth embodiment includes the feature of the outer region has a compressive stress (CS) magnitude in a range of 300 MPa to 1000 MPa.

In a nineteenth embodiment, the eighteenth embodiment includes the feature of the CS is in the range of 600 MPa to about 1000 MPa.

In a twentieth embodiment, the first through nineteenth embodiments include the feature of the glass article is selected from the group consisting of an architectural glass substrate, a vehicle interior glass substrate, and an appliance glass substrate.

A twenty-first embodiment pertains to a vehicle interior component comprising the glass article of any of the first through nineteenth embodiments.

In a twenty-second embodiment, the twenty-first embodiment includes the feature of a support surface and the glass article on the support surface.

In a twenty-third embodiment, the twenty-second embodiment includes the feature of being selected from the group consisting of a display, a center console, a dashboard, a door panel, a pillar, a floor board, an arm rest and an instrument cluster cover.

In a twenty-fourth embodiment, the twenty-second embodiment includes the feature of the glass article further includes one or more of an anti-glare coating, an anti-reflective coating, an oleophobic coating, an anti-scratch coating and an ink coating.

In a twenty-fifth embodiment, the twenty-second embodiment includes the feature of the support surface comprises fabric, leather, polymer, wood, metal and combinations thereof.

A twenty-sixth embodiment pertains to a vehicle comprising a cabin and an interior, the interior comprising the vehicle interior component of any of the twentieth through twenty-fifth embodiments.

A twenty-seventh embodiment pertains to an automobile interior component comprising a cold-formed, complexly-curved continuous glass sheet having a first portion having a first bend defining a first bend region with a set of first bend line segments, and a second portion having a second bend defining a second bend region with a set of second bend line segments, wherein the first bend line segments and the second bend line segments are independent, are not parallel, and do not intersect, at least one of the first portion and the second portion comprises a flat region that is not curved for a distance of at least 10 millimeters, and the glass article has a first bend stress magnitude at the first bend region, a second bend stress magnitude at the second bend region, and a flat region stress magnitude, and the flat region stress magnitude differs from the first bend stress magnitude and the second bend stress magnitude by at least 1 MPa.

A twenty-eighth embodiment pertains to a method of forming a complexly curved glass article comprising cold forming a continuous glass sheet about a preform having a first bend region with a set of first bend line segments, and a second bend region with a set of second bend line segments, wherein the first bend line segments and the second bend line segments are independent, are not parallel, and do not intersect.

In a twenty-ninth embodiment, the twenty-eighth embodiment includes the feature of the glass sheet has a glass transition temperature and the cold forming is performed at a temperature below the glass transition temperature.

In a thirtieth embodiment, the twenty-ninth embodiment includes the feature of the cold forming is performed at a temperature of less than 200° C.

In a thirty-first embodiment, the twenty-eighth embodiment includes the feature of the glass sheet prior to cold forming has a shape including a first portion and a second portion that intersect to form the continuous sheet.

In a thirty-second embodiment, the thirty-first embodiment includes the feature of the glass sheet prior to cold forming has a shape selected from the group consisting of an L-shape, a T-shape, an I-shape, a C-shape, an H-shape, a V-shape and an X-shape.

In a thirty-third embodiment, the thirty-second embodiment includes the feature of the cold forming imparts a first bend along a first bend axis in the first portion and a second bend along a second bend axis is the second portion.

In a thirty-fourth embodiment, the thirty-third embodiment includes the feature of the cold forming imparts a plurality of bends in the first portion along a plurality of first portion bend axes, wherein at least two of the first portion bend axes are parallel.

In a thirty-fifth embodiment, the thirty-fourth embodiment includes the feature of the cold forming imparts a plurality of bends in the second portion along a plurality of second portion bend axes, wherein at least two of the second portion bend axes are parallel.

In a thirty-sixth embodiment, the thirty-fifth embodiment includes the feature of the first portion includes an S-curve after cold forming.

In a thirty-seventh embodiment, the thirty-sixth embodiment includes the feature of the second portion includes an S-curve after cold forming.

In a thirty-eighth embodiment, the thirty-third embodiment includes the feature of at least one of the first portion and the second portion comprises a flat region after cold forming that is not curved for a distance of at least 10 millimeters.

In a thirty-ninth embodiment, the thirty-eighth embodiment includes the feature of the glass article has a first bend stress magnitude at the first bend region, a second bend stress magnitude at the second bend region, and a flat region stress magnitude, and the flat region stress magnitude differs from the first bend stress magnitude and the second bend stress magnitude by at least 1 MPa.

In a fortieth embodiment, the thirty-ninth embodiment includes the feature of the flat region stress magnitude differs from the first bend stress magnitude and the second bend stress magnitude by at least 10 MPa.

In a forty-first embodiment, the thirty-third embodiment includes the feature of the sheet has a first surface and a second surface, wherein the first bend has a first bend compressive stress at the first surface that is greater than a first bend compressive stress at the second surface, and wherein the second bend has a second bend compressive stress at the first surface that is greater than a second bend compressive stress at the second surface.

In a forty-second embodiment, the twenty-eighth embodiment includes the feature of the sheet has a first surface and a second surface and a thickness defined by the first surface and second surface, and the thickness is in a range of 25 micrometers and 5 millimeters.

In a forty-third embodiment, the twenty-eighth embodiment includes the feature of at least one of the first bend and the second bend has a radius of curvature of greater than 25 millimeters and less than 5 meters.

In a forty-fourth embodiment, the twenty-eighth embodiment includes the feature of both the first bend and the second bend have a radius of curvature of greater than 25 millimeters and less than 5 meters.

In a forty-fifth embodiment, the twenty-eighth embodiment includes the feature of the glass sheet is coated prior to cold forming.

In a forty-sixth embodiment, the twenty-eighth embodiment includes the feature of the coating comprises one or more of an anti-glare coating, an anti-reflection coating, an oleophobic coating, an anti-scratch coating and an ink coating.

In a forty-seventh embodiment, the twenty-eighth through forty-sixth embodiments include the feature of the glass article comprises a strengthened glass substrate selected from the group consisting of a laminated glass substrate, chemically strengthened glass substrate, a thermally strengthened glass substrate and a combination thereof.

In a forty-eighth embodiment, the twenty-eighth through forty-seventh embodiments include the feature of the sheet comprises an ion exchangeable alkali aluminosilicate glass composition.

In a forty-ninth embodiment, the twenty-eighth through forty-seventh embodiments include the feature of the sheet comprises an ion exchangeable alkali aluminoborosilicate glass composition.

In a fiftieth embodiment, the twenty-eighth through forty-ninth embodiments include the feature of the sheet comprises a chemically strengthened glass substrate with ions exchanged in an outer region to a depth of layer (DOL) in a range of about 10 micrometers to about 90 micrometers from an outer surface of the glass substrate.

In a fifty-first embodiment, the twenty-eighth through forty-sixth embodiments include the feature of the outer region has a compressive stress (CS) magnitude in a range of 300 MPa to 1000 MPa.

In a fifty-second embodiment, the fifty-first embodiment includes the feature of the CS is in the range of 600 MPa to about 1000 MPa.

In a fifty-third embodiment, the twenty-eighth through fifty-seventh embodiments include the feature of the glass article is selected from the group consisting of an architectural glass substrate, a vehicle interior glass substrate, and an appliance glass substrate.

A fifty-fourth embodiment of this disclosure pertains to a vehicle interior system comprising: a base having a base surface; and a glass article coupled to the surface, wherein the glass article comprises a first portion comprising a first elastically deformed surface forming a first concave shape with a first radius of curvature from about 20 mm to about 2000 mm, and a second elastically deformed surface directly opposite the first elastically deformed surface that forms a second convex shape, wherein the second elastically deformed surface has a surface compressive stress that is less than a compressive stress at the first elastically deformed surface, and a second portion adjacent the first portion, wherein the second portion is substantially planar portion or comprises a third elastically deformed surface forming a third concave shape with a third radius of curvature and a fourth elastically deformed surface that is directly opposite the third elastically deformed surface and forms a fourth convex shape, wherein the first radius of curvature and the third radius of curvature differ or the third elastically deformed surface indirectly opposes the first elastically deformed surface.

In a fifty-fifth embodiment, the fifty-fourth embodiment has substantially planar portion having a radius of curvature that is greater than about 2000 mm.

In a fifty-sixth embodiment, the fifty-fourth or fifty-fifth embodiment further comprises an adhesive disposed between the base surface and the glass article.

In a fifty-seventh embodiment, any one of the fifty-fourth through fifty-sixth embodiments further comprises a display having a display surface disposed between the base and the glass article.

In a fifty-eighth embodiment, the display surface of the fifty-seventh embodiment comprises a display radius of curvature, and wherein either one or both of the first and third elastically deformed surface is coupled to the display surface.

In a fifty-ninth embodiment, the radius of curvature of the fifty-eighth embodiment is within 10% of either one or both the first and third radius of curvature.

In a sixtieth embodiment, the fifty-seventh embodiment has a substantially planar portion that is coupled to the display.

In a sixty-first embodiment, the vehicle interior system of any one of the fifty-seventh through sixtieth embodiments further comprises an air gap between the display surface and the glass article.

In a sixty-second embodiment, the base of any one of the fifty-seventh through sixty-first embodiments comprises any one of a dashboard, a center console, a door panel, a headrest, an armrest, a seat back, a floor board, a pillar, or the steering wheel.

In a sixty-third embodiment, the base of the sixty-second embodiment comprises a concave shape having a base radius of curvature.

In a sixty-fourth embodiment, either one or both of the first and third elastically deformed concave surface of the sixty-third embodiment is coupled to the base surface.

In a sixty-fifth embodiment, the base radius of curvature of the sixty-third or sixty-fourth embodiments is within 10% of either one or both the first and third radius of curvature.

In a sixty-sixth embodiment, the glass article of any one of the fifty-fourth through the sixty-fifth embodiments comprises at least one opening.

In a sixty-seventh embodiment, any one of the fifty-fourth through the sixty-sixth embodiments has a first portion with a first thickness and a second portion with a second thickness that differs from the first thickness.

In a sixty-eighth embodiment, the sixty-seventh embodiment has a first thickness that is less than the second thickness.

In a sixty-ninth embodiment, the sixty-seventh embodiment has a first thickness that is greater than or equal to the second thickness.

In a seventieth embodiment, the second convex surface of any one of the fifty-fourth through the sixty-ninth embodiments comprises a non-zero surface compressive stress.

In a seventy-first embodiment, the vehicle interior system of any one of the fifty-fourth through seventieth embodiments further comprises a coating or surface treatment disposed on either one or both of the first elastically deformed surface and the second elastically deformed surface.

In a seventy-second embodiment, the glass article of any one of the fifty-fourth through seventy-first embodiments has a maximum thickness of about 1.5 mm or less.

In a seventy-third embodiment, the first radius of curvature of any one of the fifty-fourth through seventy-second embodiments is in a range from about 20 mm to about 1500 mm.

In a seventy-fourth embodiment, the third radius of curvature of any one of the fifty-fourth through seventy-third embodiments is in a range from about 20 mm to about 1500 mm.

In a seventy-fifth embodiment, the glass article of any one of the fifty-fourth through seventy-fourth embodiments is strengthened.

A seventy-sixth embodiment pertains to a vehicle interior system comprising a base having a curved surface; a glass article comprising a cold-formed and complexly curved continuous glass sheet disposed on the curved surface, the glass sheet comprising a glass surface, wherein at all point of the glass surface have a Gaussian curvature (GC) that is equal to zero (GC=Kmax*Kmin, wherein Kmax and Kmin are principal curvatures defined as Kmax=1/R' and Kmin=1/R"), and wherein one of Kmax and Kmin is non-zero.

In a seventy-seventh embodiment, the glass sheet of the seventy-sixth embodiment has a thickness of about 1.5 mm or less.

In a seventy-eighth embodiment, a portion of the glass surface of the seventy-sixth or seventy-seventh embodiment has comprises a concave shape and R' of the concave shape is in a range from about 37.5 mm to about 500 mm.

In a seventy-ninth embodiment, a portion of the glass surface of the seventy-sixth or seventy-seventh embodiment comprises a convex shape and R' of the convex shape is in a range from about 20 mm to about 500 mm.

In an eightieth embodiment, the vehicle interior system of any one of the seventy-sixth through seventy-ninth embodiments further comprises a display.

In an eighty-first embodiment, the display of the eightieth embodiment is disposed between the base and the glass article.

In an eighty-second embodiment, the display of the eightieth or eighty-first embodiment is curved.

In an eighty-third embodiment, the glass sheet of any one of the seventy-sixth through eighty-second embodiments sheet is strengthened.

In an eighty-fourth embodiment, the glass sheet of any one of the seventy-sixth through eighty-third embodiments comprises a first major surface and a second major surface opposing the first major surface, wherein either one or both of the first major surface and the second major surface comprises a coating or surface treatment.

In an eighty-fifth embodiment, the glass sheet of any one of the seventy-sixth through eighty-fourth embodiments comprises an opening.

An eighty-sixth embodiment pertains to a glass article for an automobile interior comprising: a first portion having a first length with a first bend over at least a portion of the first length, the first bend having a first bend axis; a second portion extending in a direction generally perpendicular to the first portion, the second portion having a second length with a second bend over at least a portion of the second length, the second portion having a second bend axis; wherein the bend in the first portion and the bend in the second portion concavely curve in opposite directions and the first bend axis and the second bend axis are not parallel.

In an eighty-seventh embodiment, the glass article of the eighty-sixth embodiment includes a bend in the first portion and a bend in the second portion that are separated by a substantially planar portion.

In an eighty-eighth embodiment, the glass article of the eighty-sixth or eighty-seventh embodiments has a T-shape.

In an eighty-ninth embodiment, the glass article of the eighty-sixth or eighty-seventh embodiments has an L-shape.

In an ninetieth embodiment, the glass article of any one of the eighty-sixth through eighty-ninth embodiments further comprises a third bend axis that is parallel to one of the first and second bend axes.

In ninety-first embodiment, the glass article of any one of the eighty-sixth through ninetieth embodiments has a thickness of about 1.5 mm or less.

In ninety-second embodiment, the glass article of any one of the eighty-sixth through ninety-first embodiments has a portion that comprises a concave shape and R' of the concave shape is in a range from about 37.5 mm to about 500 mm.

In ninety-third embodiment, the glass article of any one of the eighty-sixth through ninety-first embodiments has a portion that comprises a convex shape and R' of the convex shape is in a range from about 20 mm to about 500 mm.

In ninety-fourth embodiment, the glass article of any one of the eighty-sixth through ninety-third embodiments comprises a first major surface and a second major surface opposing the first major surface, wherein either one or both of the first major surface and the second major surface comprises a coating or surface treatment.

In ninety-fifth embodiment, the glass article of any one of the eighty-sixth through ninety-fourth embodiments has a first major surface and a second major surface opposing the first major surface and a display or touch panel coupled to the first surface.

In a ninety-sixth embodiment, the glass article of the ninety-fifth embodiment further comprises an air gap between the display and the first surface.

In a ninety-seventh embodiment, the display or touch panel of the ninety-fifth through ninety-sixth embodiments is curved.

In a ninety-eighth embodiment, the glass article of any one of the eighty-sixth through ninety-seventh embodiments, wherein the glass article is strengthened.

In a ninety-ninth embodiment, the glass article of any one of the eighty-sixth through ninety-eighth embodiments, wherein the glass article further comprises an opening.

Although the disclosure herein has been described with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents.

What is claimed is:

1. A vehicle interior system comprising:
a base having a base surface; and
a glass article coupled to the surface, wherein the glass article comprises a first portion comprising a first elastically deformed surface forming a first concave shape with a first radius of curvature from about 20 mm to about 2000 mm, and a second elastically deformed surface directly opposite the first elastically deformed surface that forms a second convex shape, wherein the second elastically deformed surface has a surface compressive stress that is less than a compressive stress at the first elastically deformed surface, and a second portion adjacent the first portion, wherein the second portion is substantially planar portion or comprises a third elastically deformed surface forming a third concave shape with a third radius of curvature and a fourth elastically deformed surface that is directly opposite the third elastically deformed surface and forms a fourth convex shape, wherein the first radius of curvature and the third radius of curvature differ or the third elastically deformed surface indirectly opposes the first elastically deformed surface.

2. The vehicle interior system of claim 1, further comprising an adhesive disposed between the base surface and the glass article.

3. The vehicle interior system of claim 1, further comprising a display having a display surface disposed between the base and the glass article.

4. The vehicle interior system of claim 3, wherein the display surface comprises a display radius of curvature, and wherein either one or both of the first and third elastically deformed surface is coupled to the display surface.

5. The vehicle interior system of claim 4, wherein the display radius of curvature is within 10% of either one or both the first and third radius of curvature.

6. The vehicle interior system of claim 1, further comprising a coating or surface treatment disposed on either one or both of the first elastically deformed surface and the second elastically deformed surface.

7. The vehicle interior system of claim 1, wherein the glass article has a maximum thickness of about 1.5 mm or less.

8. The vehicle interior system of claim 1, wherein the glass article is strengthened.

9. A vehicle interior system comprising:
a base having a curved surface;
a glass article comprising a cold-formed and complexly curved continuous glass sheet disposed on the curved surface, the glass sheet comprising a glass surface, wherein at all point of the glass surface have a Gaussian curvature (GC) that is equal to zero (GC=Kmax*Kmin, wherein Kmax and Kmin are principal curvatures defined as Kmax=1/R' and Kmin=1/R"), and wherein one of Kmax and Kmin is non-zero.

10. A glass article for an automobile interior comprising:
a first portion having a first length with a first bend over at least a portion of the first length, the first bend having a first bend axis;
a second portion extending in a direction generally perpendicular to the first portion, the second portion having a second length with a second bend over at least a portion of the second length, the second portion having a second bend axis;
wherein the bend in the first portion and the bend in the second portion concavely curve in opposite directions and the first bend axis and the second bend axis are not parallel.

11. The glass article of claim 10, wherein the bend in the first portion and the bend in the second portion are separated by a substantially planar portion.

12. The glass article of claim 10, wherein the glass article has a T-shape or an L shape.

13. The glass article of claim 10, further comprising a third bend axis that is parallel to one of the first and second bend axes.

14. The glass article of claim 10, wherein the glass article has a thickness of about 1.5 mm or less.

15. The glass article of claim 10, wherein the glass article comprises a first major surface and a second major surface opposing the first major surface, wherein either one or both of the first major surface and the second major surface comprises a coating or surface treatment.

16. The glass article of claim 10, wherein the glass article comprises a first major surface and a second major surface opposing the first major surface and a display or touch panel coupled to the first surface.

17. The glass article of claim 16, further comprising an air gap between the display and the first surface.

18. The glass article of claim 16, wherein the display or touch panel is curved.

19. The glass article of claim 10, wherein the glass article is strengthened.

20. The glass article of claim 10, wherein the glass article further comprises an opening.

\* \* \* \* \*

UNITED STATES PATENT AND TRADEMARK OFFICE
CERTIFICATE OF CORRECTION

PATENT NO. : 11,332,011 B2
APPLICATION NO. : 16/631558
DATED : May 17, 2022
INVENTOR(S) : James Gregory Couillard et al.

Page 1 of 1

It is certified that error appears in the above-identified patent and that said Letters Patent is hereby corrected as shown below:

On the Title Page

On the page 5, in item (56), in Column 2, under "Other Publications", Line 19, delete ""Pegaton" and insert -- "Pegatron --.

On the page 5, in item (56), in Column 2, under "Other Publications", Line 20, delete "Cnsoie" and insert -- Console --.

On the page 5, in item (56), in Column 2, under "Other Publications", Line 41, delete "Writien" and insert -- Written --.

On the page 6, in item (56), in Column 1, under "Other Publications", Line 1, delete "Writien" and insert -- Written --.

On the page 6, in item (56), in Column 1, under "Other Publications", Line 40, delete "Beus" and insert -- Selis --.

On the page 6, in item (56), in Column 1, under "Other Publications", Line 49, delete "Faade" and insert -- Facade~ --.

On the page 6, in item (56), in Column 1, under "Other Publications", Line 50, delete "Faade"," and insert -- Facade", --.

Signed and Sealed this
Thirteenth Day of September, 2022

Katherine Kelly Vidal
*Director of the United States Patent and Trademark Office*